United States Patent
Seshadri et al.

(10) Patent No.: US 12,261,870 B2
(45) Date of Patent: Mar. 25, 2025

(54) TRACKING HOST THREATS IN A NETWORK AND ENFORCING THREAT POLICY ACTIONS FOR THE HOST THREATS

(71) Applicant: Juniper Networks, Inc., Sunnyvale, CA (US)

(72) Inventors: Prakash T. Seshadri, Fremont, CA (US); Binh Phu Le, San Jose, CA (US); Srinivas Nimmagadda, San Jose, CA (US); Jeffrey S. Marshall, Santa Clara, CA (US); Kartik Krishnan S. Iyyer, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/529,413

(22) Filed: Dec. 5, 2023

(65) Prior Publication Data
US 2024/0106849 A1    Mar. 28, 2024

Related U.S. Application Data

(63) Continuation of application No. 16/949,865, filed on Nov. 18, 2020, now Pat. No. 11,888,877, which is a
(Continued)

(51) Int. Cl.
*H04L 9/40* (2022.01)
*G06F 16/22* (2019.01)
(Continued)

(52) U.S. Cl.
CPC ...... *H04L 63/1425* (2013.01); *G06F 16/2228* (2019.01); *G06F 16/2379* (2019.01);
(Continued)

(58) Field of Classification Search
CPC .................................................. H04L 63/1425
See application file for complete search history.

(56) References Cited

U.S. PATENT DOCUMENTS

| 7,483,437 B1 | 1/2009 | Mohaban |
| 7,748,047 B2 | 6/2010 | O'Neill |

(Continued)

FOREIGN PATENT DOCUMENTS

| CN | 101068168 A | 11/2007 |
| CN | 101203841 A | 6/2008 |

(Continued)

OTHER PUBLICATIONS

Extended European Search Report for Application No. EP19163028. 4, mailed on Jun. 17, 2019, 9 pages.
(Continued)

*Primary Examiner* — Simon P Kanaan
(74) *Attorney, Agent, or Firm* — Harrity & Harrity, LLP

(57) ABSTRACT

A device receives network segment information identifying network segments associated with a network, and receives endpoint host session information identifying sessions associated with endpoint hosts communicating with the network. The device generates, based on the network segment information and the endpoint host session information, a data structure that includes information associating the network segments with the sessions associated with the endpoint hosts. The device updates the data structure based on changes in the sessions associated with the endpoint hosts and based on changes in locations of the endpoint hosts within the network segments, and identifies, based on the data structure, a particular endpoint host, of the endpoint hosts, that changed locations within the network segments. The device determines a threat policy action to enforce for the particular endpoint host, and causes the threat policy
(Continued)

action to be enforced, by the network, for the particular endpoint host.

20 Claims, 16 Drawing Sheets

Related U.S. Application Data continuation of application No. 16/024,319, filed on Jun. 29, 2018, now Pat. No. 10,862,912.

(60) Provisional application No. 62/647,431, filed on Mar. 23, 2018, provisional application No. 62/647,460, filed on Mar. 23, 2018.

(51) Int. Cl.
*G06F 16/23* (2019.01)
*H04L 67/52* (2022.01)

(52) U.S. Cl.
CPC ...... *H04L 63/0209* (2013.01); *H04L 63/1416* (2013.01); *H04L 63/1433* (2013.01); *H04L 63/1441* (2013.01); *H04L 63/20* (2013.01); *H04L 67/52* (2022.05)

(56) References Cited

U.S. PATENT DOCUMENTS

| | | | |
|---|---|---|---|
| 7,930,734 B2 | 4/2011 | Foo et al. | |
| 8,443,435 B1 | 5/2013 | Schroeder | |
| 8,819,285 B1 | 8/2014 | Wilkinson et al. | |
| 9,516,053 B1 | 12/2016 | Muddu et al. | |
| 9,680,691 B2 | 6/2017 | Tahara et al. | |
| 9,704,172 B2* | 7/2017 | Murray | G06F 3/0482 |
| 9,923,929 B2* | 3/2018 | Mitevski | H04L 63/10 |
| 9,954,881 B1 | 4/2018 | Lin et al. | |
| 10,491,594 B2 | 11/2019 | Yan | |
| 10,645,115 B2 | 5/2020 | C'P et al. | |
| 10,862,912 B2* | 12/2020 | Seshadri | H04L 63/1425 |
| 10,887,327 B2 | 1/2021 | Nimmagadda | |
| 10,929,538 B2 | 2/2021 | Jiang | |
| 2008/0244707 A1 | 10/2008 | Bowser et al. | |
| 2008/0262990 A1 | 10/2008 | Kapoor et al. | |
| 2009/0265786 A1 | 10/2009 | Xie et al. | |
| 2011/0173699 A1 | 7/2011 | Figlin et al. | |
| 2013/0074143 A1 | 3/2013 | Bu et al. | |
| 2013/0174256 A1 | 7/2013 | Powers | |
| 2014/0180870 A1 | 6/2014 | Bombeck et al. | |
| 2014/0283061 A1 | 9/2014 | Quinlan et al. | |
| 2015/0058914 A1 | 2/2015 | Yadav | |
| 2015/0128274 A1 | 5/2015 | Giokas | |
| 2015/0135317 A1 | 5/2015 | Tock et al. | |
| 2015/0188949 A1 | 7/2015 | Mahaffey et al. | |
| 2015/0229656 A1 | 8/2015 | Shieh | |
| 2015/0264073 A1 | 9/2015 | Tavakoli et al. | |
| 2016/0226912 A1 | 8/2016 | Clark et al. | |
| 2016/0359872 A1 | 12/2016 | Yadav et al. | |
| 2017/0019418 A1 | 1/2017 | Ikuse et al. | |
| 2017/0063909 A1 | 3/2017 | Muddu et al. | |
| 2017/0063917 A1 | 3/2017 | Chesla | |
| 2017/0063920 A1 | 3/2017 | Thomas et al. | |
| 2017/0142144 A1 | 5/2017 | Weinberger et al. | |
| 2017/0171235 A1 | 6/2017 | Mulchandani et al. | |
| 2017/0171318 A1 | 6/2017 | Levithan | |
| 2017/0201533 A1 | 7/2017 | Targali et al. | |
| 2017/0214701 A1* | 7/2017 | Hasan | H04L 63/1433 |
| 2017/0230412 A1 | 8/2017 | Thomas et al. | |
| 2017/0250997 A1 | 8/2017 | Rostamabadi et al. | |
| 2018/0004948 A1 | 1/2018 | Martin et al. | |
| 2018/0041515 A1 | 2/2018 | Gupta et al. | |
| 2018/0063143 A1 | 3/2018 | Wilson et al. | |
| 2018/0083967 A1 | 3/2018 | Subramanian et al. | |
| 2018/0131705 A1 | 5/2018 | Samadani et al. | |
| 2018/0191681 A1 | 7/2018 | Mihelich et al. | |
| 2018/0219899 A1 | 8/2018 | Joy et al. | |
| 2018/0322946 A1* | 11/2018 | Ika | G06F 21/6254 |
| 2019/0098056 A1 | 3/2019 | Pitre et al. | |
| 2019/0116200 A1 | 4/2019 | Joy et al. | |
| 2019/0260804 A1 | 8/2019 | Beck et al. | |
| 2020/0162516 A1 | 5/2020 | Israel et al. | |
| 2021/0075810 A1 | 3/2021 | Seshadri et al. | |
| 2021/0099472 A1 | 4/2021 | Nimmagadda et al. | |

FOREIGN PATENT DOCUMENTS

| | | |
|---|---|---|
| CN | 101453363 A | 6/2009 |
| CN | 101488855 A | 7/2009 |
| CN | 103404082 A | 11/2013 |
| CN | 103875222 A | 6/2014 |
| CN | 105580023 A | 5/2016 |
| CN | 105791311 A | 7/2016 |
| CN | 105991595 A | 10/2016 |
| CN | 106575323 A | 4/2017 |
| CN | 106656922 A | 5/2017 |
| CN | 107872456 A | 4/2018 |
| EP | 1470691 A2 | 10/2004 |
| WO | 2009029606 A2 | 3/2009 |
| WO | 2017160770 A1 | 9/2017 |

OTHER PUBLICATIONS

Extended European Search Report for Application No. EP19163066.4, mailed on Jun. 28, 2019, 8 pages.

Extended European Search Report for Application No. EP23162944.5, mailed on Jun. 13, 2023, 8 pages.

Zhaoquan, C., et al., "Investigation and Implementation of Combined Security Technology for Intranet," Microcomputer Applications, vol. 27(2), Mar. 2006.

* cited by examiner

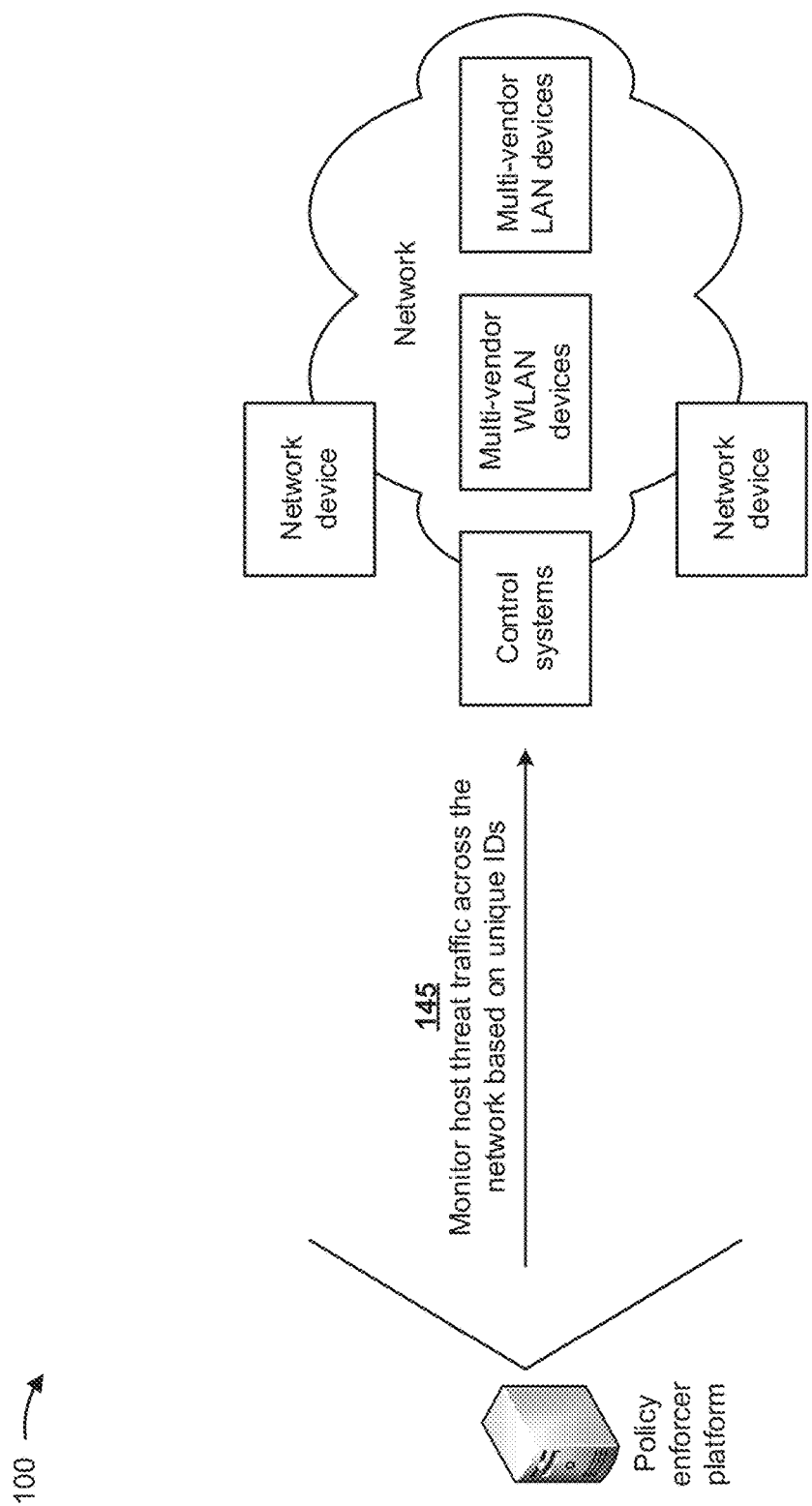

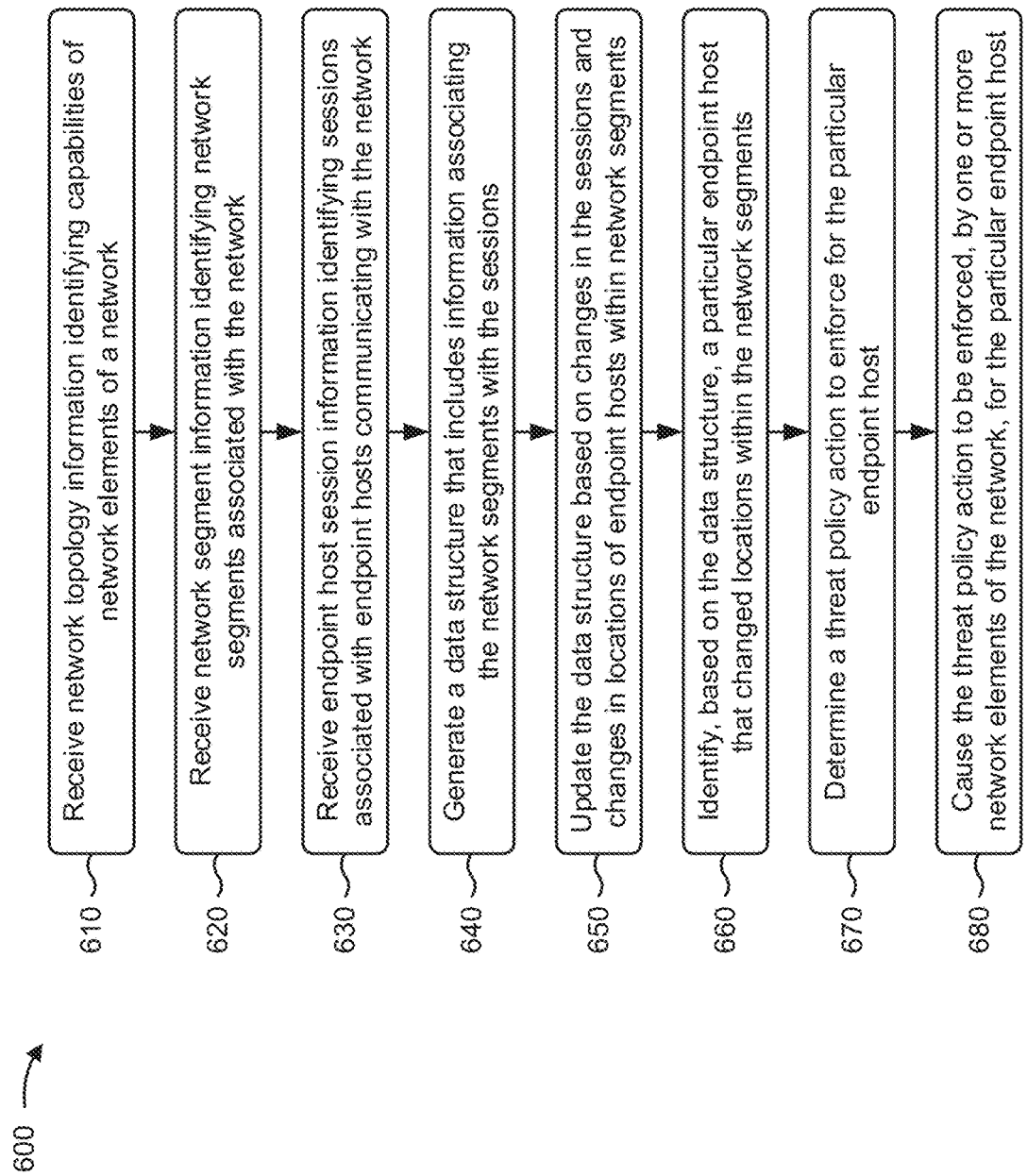

TRACKING HOST THREATS IN A NETWORK AND ENFORCING THREAT POLICY ACTIONS FOR THE HOST THREATS

RELATED APPLICATIONS

This application is a continuation of U.S. patent application Ser. No. 16/949,865, filed Nov. 18, 2020, which is a continuation of U.S. patent application Ser. No. 16/024,319, filed Jun. 29, 2018 (now U.S. Pat. No. 10,862,912), which claims priority under 35 U.S.C. § 119 to U.S. Provisional Patent Application Nos. 62/647,431 and 62/647,460, filed on Mar. 23, 2018, the contents of all of which are incorporated herein by reference in their entireties.

BACKGROUND

As malware becomes more sophisticated, threat prevention solutions may provide sufficient threat detection to enforce infected endpoint host security controls at a perimeter of a network. However, given adaptive network changes where threats are injected both from external endpoint host threats and internal endpoint host threats, security controls at the perimeter of the network may be insufficient. For example, an endpoint host threat, blocked at a perimeter of a network, that connected to the network at a specific network segment may bypass security controls when the endpoint host threat laterally moves to a different network segment, a different campus, a different site, and/or the like because a network address (e.g., an Internet protocol (IP) address, a media access control (MAC) address, and/or the like) associated with the endpoint host threat may change.

SUMMARY

According to some implementations, a device may include one or more memories, and one or more processors to receive network segment information identifying network segments associated with a network, and receive endpoint host session information identifying sessions associated with endpoint hosts communicating with the network. The one or more processors may generate, based on the network segment information and the endpoint host session information, a data structure that includes information associating the network segments with the sessions associated with the endpoint hosts. The one or more processors may update the data structure based on changes in the sessions associated with the endpoint hosts and based on changes in locations of the endpoint hosts within the network segments, and may identify, based on the data structure, a particular endpoint host, of the endpoint hosts, that changed locations within the network segments. The one or more processors may determine a threat policy action to enforce for the particular endpoint host, and may cause the threat policy action to be enforced, by the network, for the particular endpoint host.

According to some implementations, a non-transitory computer-readable medium may store instructions that include one or more instructions that, when executed by one or more processors of a device, cause the one or more processors to receive host threat feed information associated with endpoint hosts communicating with a network, and receive network segment information identifying network segments associated with a network. The one or more instructions may cause the one or more processors to receive endpoint host session information identifying sessions associated with the endpoint hosts, and generate, based on the host threat feed information, the network segment information, and the endpoint host session information, a data structure that includes information identifying host threat feeds associated with the endpoint hosts, and information associating the network segments with the sessions associated with the endpoint hosts. The one or more instructions may cause the one or more processors to update the data structure based on changes in the sessions associated with the endpoint hosts and based on changes in locations of the endpoint hosts within the network segments, and identify, based on the data structure, a particular endpoint host, of the endpoint hosts, that changed locations within the network segments. The one or more instructions may cause the one or more processors to determine a threat policy action to enforce for the particular endpoint host, and cause the threat policy action to be enforced, by the network, for the particular endpoint host.

According to some implementations, a method may include receiving network topology information identifying capabilities of network elements of a network, and receiving network segment information identifying network segments associated with the network. The method may include receiving endpoint host session information identifying sessions associated with endpoint hosts communicating with the network, and generating, based on the network topology information, the network segment information, and the endpoint host session information, a data structure that includes information associating the network segments with the sessions associated with the endpoint hosts. The method may include updating the data structure based on changes in the sessions associated with the endpoint hosts and based on changes in locations of the endpoint hosts within the network segments, and identifying, based on the data structure, a particular endpoint host, of the endpoint hosts, that changed locations within the network segments. The method may include determining a threat policy action to enforce for the particular endpoint host, and causing the threat policy action to be enforced, by one or more of the network elements of the network, for the particular endpoint host.

BRIEF DESCRIPTION OF THE DRAWINGS

FIGS. 1A-1K are diagrams of an example implementation described herein.

FIG. 6 is a flow chart of an example process for tracking host threats in a network and enforcing threat policy actions for the host threats.

DETAILED DESCRIPTION

The following detailed description of example implementations refers to the accompanying drawings. The same reference numbers in different drawings may identify the same or similar elements.

Threat remediation systems that are not aware of mobility of an underlying endpoint host threat in the network introduce several challenges. For example, threat identification is limited to detection in a data path of an endpoint host threat communicating with a network through a perimeter network device, lateral propagation of the endpoint host threat inside the network cannot be detected and cannot be contained from further spreading, and once the endpoint host threat moves to a different network segment, the endpoint host threat may gain additional access and privileges to compromise an unprotected network segment. As a result, threat remediation systems are unable to monitor, identify, and remediate endpoint host threats consistently and effectively in real-time across an entire network.

Some implementations described herein provide a policy enforcer platform that tracks host threats in a network and enforces threat policy actions for the host threats. For example, the policy enforcer platform may receive network segment information identifying network segments associated with a network, and may receive endpoint host session information identifying sessions associated with endpoint hosts communicating with the network. The policy enforcer platform may generate, based on the network segment information and the endpoint host session information, a data structure that includes information associating the network segments with the sessions associated with the endpoint hosts. The policy enforcer platform may update the data structure based on changes in the sessions associated with the endpoint hosts and based on changes in locations of the endpoint hosts within the network segments, and may identify, based on the data structure, a particular endpoint host, of the endpoint hosts, that changed locations within the network segments. The policy enforcer platform may determine a threat policy action to enforce for the particular endpoint host, and may cause the threat policy action to be enforced, by the network, for the particular endpoint host.

Figure 1A:
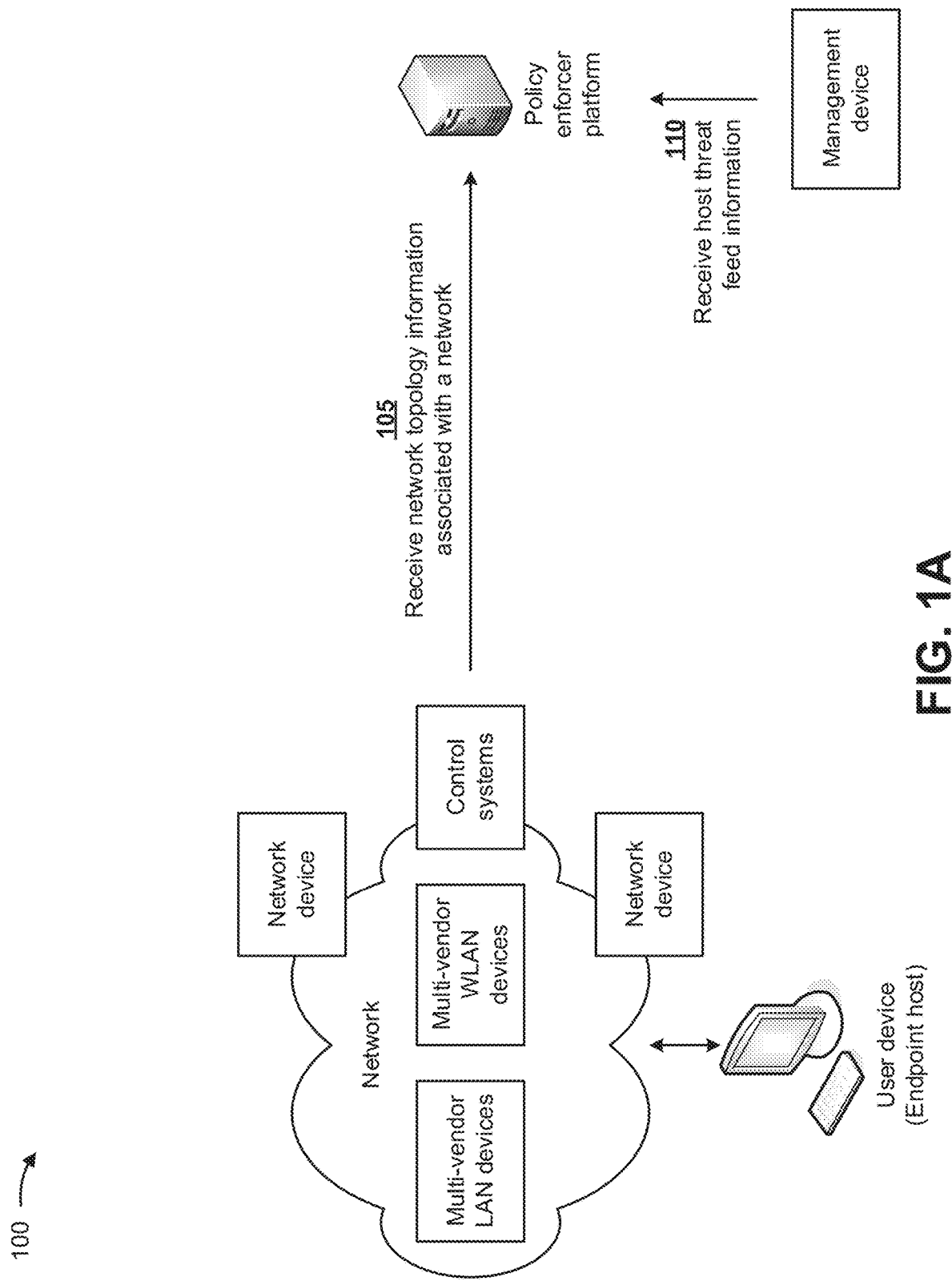

FIGS. 1A-1K are diagrams of an example implementation 100 described herein. As shown in FIG. 1A, a user device (e.g., an endpoint host) may be associated with a network, a policy enforcer platform, and a management device. As further shown in FIG. 1A, the network may include local area network (LAN) devices possibly provided by multiple, different vendors (e.g., multi-vendor LAN devices), wireless local area network (WLAN) devices possible provided by multiple, different vendors (e.g., multi-vendor WLAN devices), network devices possibly provided by multiple, different vendors, and/or network control systems possibly provided by multiple, different vendors (e.g., control systems). In some implementations, each control system may control and/or manage a network segment of the network. For example, a control system associated with a particular vendor may control a network segment with devices associated with the particular vendor.

As further shown in FIG. 1A, and by reference number 105, the policy enforcer platform may receive, from one or more of the control systems, network topology information associated with the network. In some implementations, the network topology information may include information identifying the devices (e.g., the multi-vendor LAN devices, the multi-vendor WLAN devices, the network devices, the control systems, the endpoint hosts, and/or the like) associated with the network. For example, the network topology information may include information identifying manufacturers, models, device identifiers, throughputs, bandwidths, network addresses, and/or the like of the devices associated with the network, information identifying hardware provided in the devices associated with the network, information identifying software provided in the devices associated with the network, and/or the like.

As further shown in FIG. 1A, and by reference number 110, the policy enforcer platform may receive, from the management device, host threat feed information associated with the network. In some implementations, the management device may include a security information and event management (STEM) device that combines security information management (SIM) and security event management (SEM), and provides real-time analysis of security alerts generated by applications and devices associated with the network. In some implementations, the host threat feed information may include information identifying threat feeds (e.g., feeds provided by endpoint hosts and including threats) associated with the network. In some implementations, the host threat feed information may include information identifying network addresses (e.g., IP addresses) associated with the threat feeds.

Figure 1B:
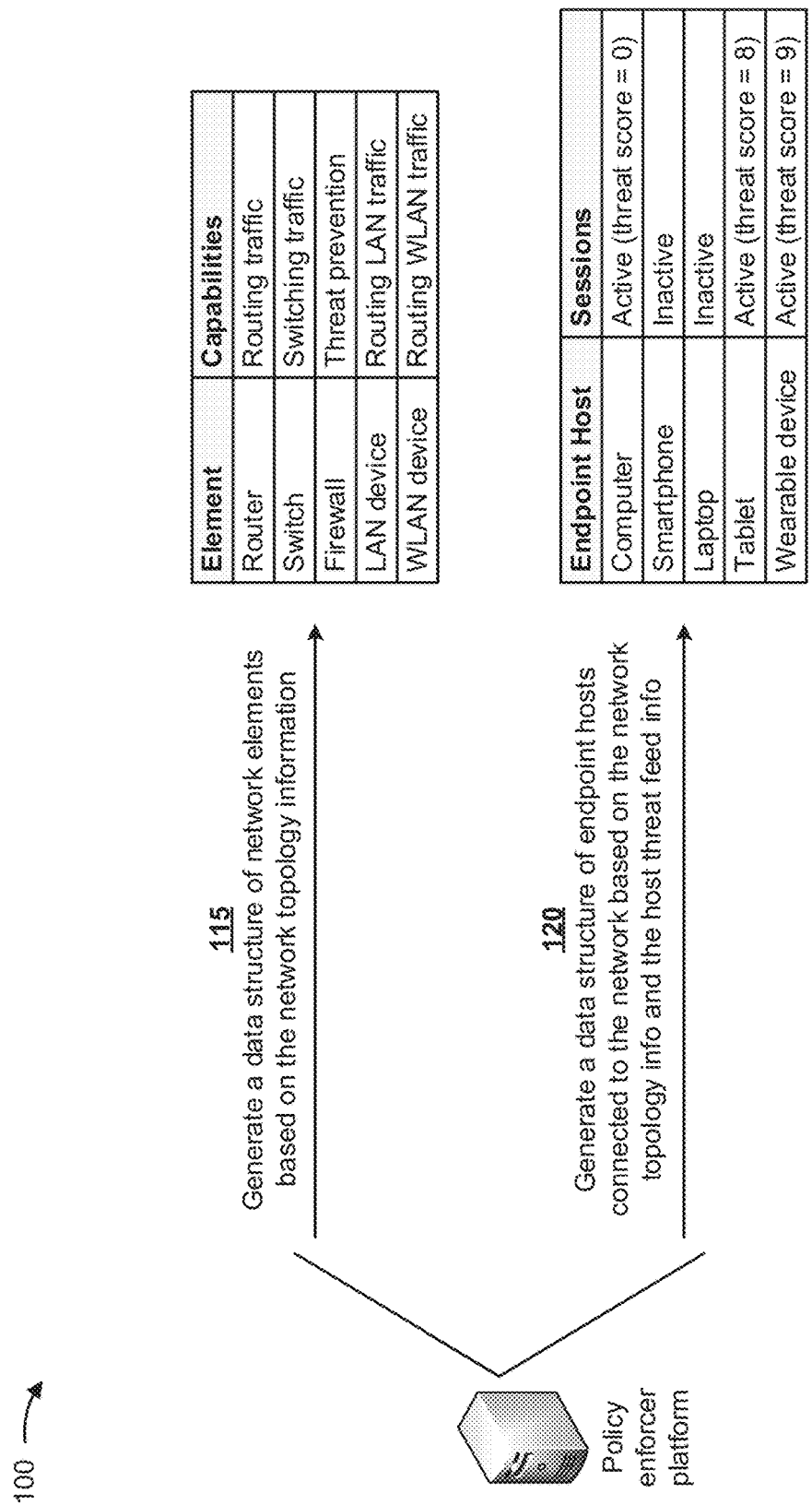

As shown in FIG. 1B, and by reference number 115, the policy enforcer platform may generate a data structure (e.g., a database, a table, a list, and/or the like), that includes information identifying network elements (e.g., the multi-vendor LAN devices, the multi-vendor WLAN devices, the network devices, the control systems, the endpoint hosts, and/or the like) associated with the network, based on the network topology information. In some implementations, the data structure may include the network topology information associated with the network elements, as described above. In some implementations, the policy enforcer platform may utilize the network topology information to determine capabilities associated with the network elements, and may store information identifying the capabilities associated with the network elements in the data structure. For example, as further shown in FIG. 1B, the data structure may include information identifying network elements (e.g., a router, a switch, a firewall, a LAN device, a WLAN device, and/or the like), information identifying capabilities of the network elements (e.g., routing traffic, switching traffic, threat prevention, routing LAN traffic, routing WLAN traffic, and/or the like), and/or the like. In some implementations, the data structures, described herein, may be stored in a memory associated with the policy enforcer platform.

In some implementations, the policy enforcer platform may utilize the network topology information to determine capabilities associated with the network elements by analyzing the network topology information, and determining hardware, software, models, throughputs, bandwidths, network addresses, and/or the like of the devices associated with the network based on the analyzing the network topology information. The policy enforcer platform may determine the capabilities associated with the network elements based on the hardware, software, models, throughputs, bandwidths, network addresses, and/or the like of the devices associated with the network.

In some implementations, the policy enforcer platform may process the network topology information, with one or more artificial intelligence models, to determine the capabilities associated with the network elements. In some implementations, the one or more artificial intelligence models may include one or more of a support vector machine model, an artificial neural network model, a data mining model, a pattern discovery model, and/or the like.

A support vector machine model may include a supervised learning model with one or more associated learning algorithms that analyze data used for classification and regression analysis. Given a set of training examples, each training example being marked as belonging to one or the other of two categories, a training method of the support vector machine model builds a model that assigns new examples to one category or the other. The support vector machine model is a representation of examples as points in space, mapped so that the examples of separate categories are divided by a clear gap that is as wide as possible. New examples are then mapped into that same space and predicted to belong to a category based on which side of the gap they fall.

An artificial neural network model may include a model that uses an artificial neural network (e.g., to determine the capabilities associated with the network elements). An artificial neural network utilizes a collection of connected units or nodes called artificial neurons. Each connection between artificial neurons can transmit a signal from one artificial neuron to another artificial neuron. The artificial neuron that receives the signal can process the signal and then provide a signal to artificial neurons to which it is connected. Artificial neurons and connections typically have a weight that adjusts as learning proceeds. The weight may increase or decrease the strength of the signal at a connection. Additionally, an artificial neuron may have a threshold such that the artificial neuron only sends a signal if the aggregate signal satisfies the threshold. Typically, artificial neurons are organized in layers, and different layers may perform different kinds of transformations on their inputs.

A data mining model may include a model that performs anomaly detection (e.g., outlier, change, and/or deviation detection) to identify unusual data records of interest or data errors that require further investigation, association rule learning (e.g., dependency modeling) to search for relationships between variables, clustering to discover groups and/or structures in data that are similar without using known structures in the data, classification to generalize known structure to apply to new data, regression to identify a function that models the data with the least error, summarization to provide a more compact representation of the data set, including visualization and report generation, and/or the like.

A pattern discovery model may include a data mining technique, such as sequential pattern mining Sequential pattern mining is a type of structured data mining that seeks to identify statistically relevant patterns between data examples where the values are delivered in a sequence. Sequential pattern mining may be classified as string mining (e.g., which is based on string processing models), and/or item set mining (e.g., which is based on association rule learning). String mining deals with a limited alphabet for items that appear in a sequence, but where the sequence itself may be very long. Item set mining deals with discovering frequent item sets, and an order in which the frequent item sets appear.

In some implementations, the policy enforcer platform may utilize one or more of the artificial intelligence models, and may utilize best results determined by one of the artificial intelligence models. In some implementations, the policy enforcer platform may utilize a plurality of the artificial intelligence models, and may aggregate the results determined by the plurality of artificial intelligence models.

As further shown in FIG. 1B, and by reference number 120, the policy enforcer platform may generate a data structure (e.g., a database, a table, a list, and/or the like) that includes information identifying endpoint hosts (e.g., the user devices) connected to the network, based on the network topology information and/or the host threat feed information. In some implementations, the data structure may include the network topology information associated with the endpoint hosts, described above. In some implementations, the policy enforcer platform may utilize the network topology information and/or the host threat feed information to determine sessions associated with the endpoint hosts, and may store information identifying the sessions associated with the endpoint hosts in the data structure. For example, as further shown in FIG. 1B, the data structure may include information identifying endpoint hosts (e.g., a computer, a smartphone, a laptop, a tablet, a wearable device, and/or the like), information identifying sessions of the endpoint hosts (e.g., active, inactive, and/or the like), information identifying threat scores associated with the sessions (e.g., based on a threat scale from zero to ten, where a zero indicates no threat and a ten indicates a greatest threat), and/or the like. In some implementations, the threat scores may be provided by the host threat feed information.

Figure 1C:

As shown in FIG. 1C, and by reference number 125, the policy enforcer platform may identify control systems associated with the endpoint hosts of the data structure that includes information identifying endpoint hosts (e.g., as shown in FIG. 1B). In some implementations, the policy enforcer platform may utilize network addresses (e.g., IP addresses) of the endpoint hosts to match each endpoint host with a specific network segment. In such implementations, the policy enforcer platform may determine (e.g., based on the network topology information) which control system is associated with (e.g., manages) each specific network segment, and, accordingly, may identify control systems associated with the endpoint hosts. In some implementations, the policy enforcer platform may add information identifying associated control systems to the data structure that includes information identifying endpoint hosts. For example, as further shown in FIG. 1C, control system 1 may be associated with the computer and the smartphone, control system 2 may be associated with the tablet, control system 3 may be associated with the laptop, and control system 4 may be associated with the wearable device.

Figure 1D:
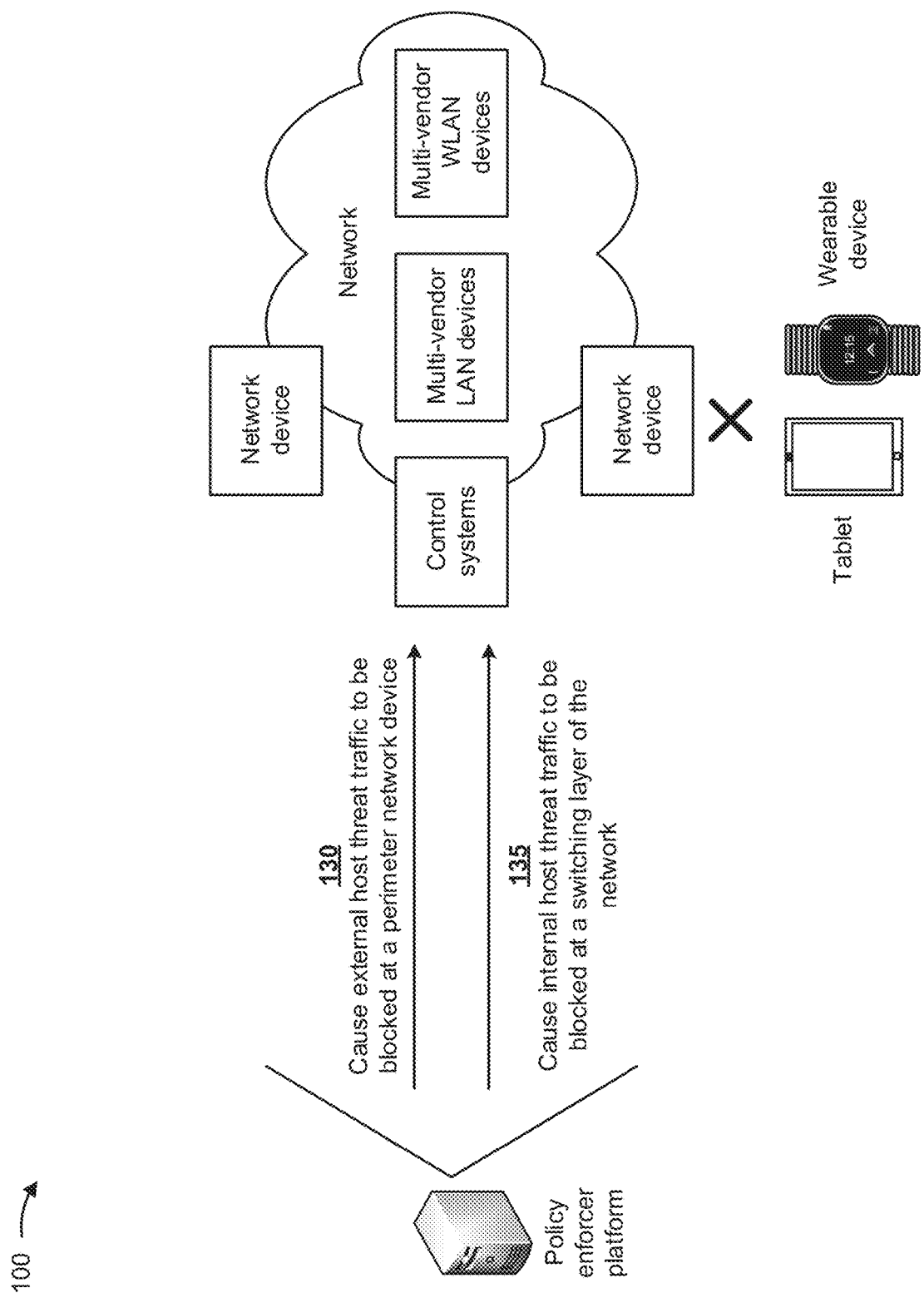

With reference to FIG. 1D, in some implementations and based on the host threat feed information (e.g., based on threat scores associated with host threat feeds), the policy enforcer may orchestrate threat enforcement actions by blocking endpoint host traffic at perimeter network devices (e.g., firewalls) of the network for external host threat traffic (e.g., north-south communications) provided between the LAN devices and/or the WLAN devices, the network devices, and the endpoint hosts. Additionally, or alternatively, the policy enforcer may orchestrate threat enforcement actions by blocking endpoint host traffic at a switching layer of the network for internal host threat traffic (e.g., east-west communications) provided among the LAN devices and/or among the WLAN devices.

As shown in FIG. 1D, and by reference number 130, the policy enforcer platform may cause the external host threat traffic to be blocked at a perimeter network device of the network. In some implementations, the policy enforcer platform may provide, to a control system associated with the perimeter network device, information indicating that the perimeter network device is to block the external host threat traffic. In such implementations, the control system may provide, to the perimeter network device, instructions to block the external host threat traffic. The perimeter network device may receive the instructions, and may block the external host threat traffic based on the instructions. For example, since the tablet and the wearable device have active sessions with threat scores of eight and nine, respectively (e.g., as shown in FIG. 1C), the policy enforcer platform may determine that the tablet and the wearable device represent external host threat traffic, and may cause the perimeter network device associated with the tablet and the wearable device to block traffic received from the tablet and the wearable device, as further shown in FIG. 1D.

As further shown in FIG. 1D, and by reference number 135, the policy enforcer platform may cause the internal host threat traffic to be blocked at a switching layer of the network. In some implementations, the policy enforcer platform may provide, to a control system associated with the switching layer (e.g., communications among LAN devices and/or WLAN devices), information indicating that the LAN devices and/or the WLAN devices are to block the internal host threat traffic. In such implementations, the control system may provide, to the LAN devices and/or the WLAN devices, instructions to block the internal host threat traffic. The LAN devices and/or the WLAN devices may receive the instructions, and may block the internal host threat traffic based on the instructions. For example, the policy enforcer platform may determine that the tablet and the wearable device generated internal host threat traffic in a LAN and/or a WLAN, and may cause the LAN devices and/or the WLAN devices associated with the LAN and/or the WLAN to block such traffic.

Figure 1E:
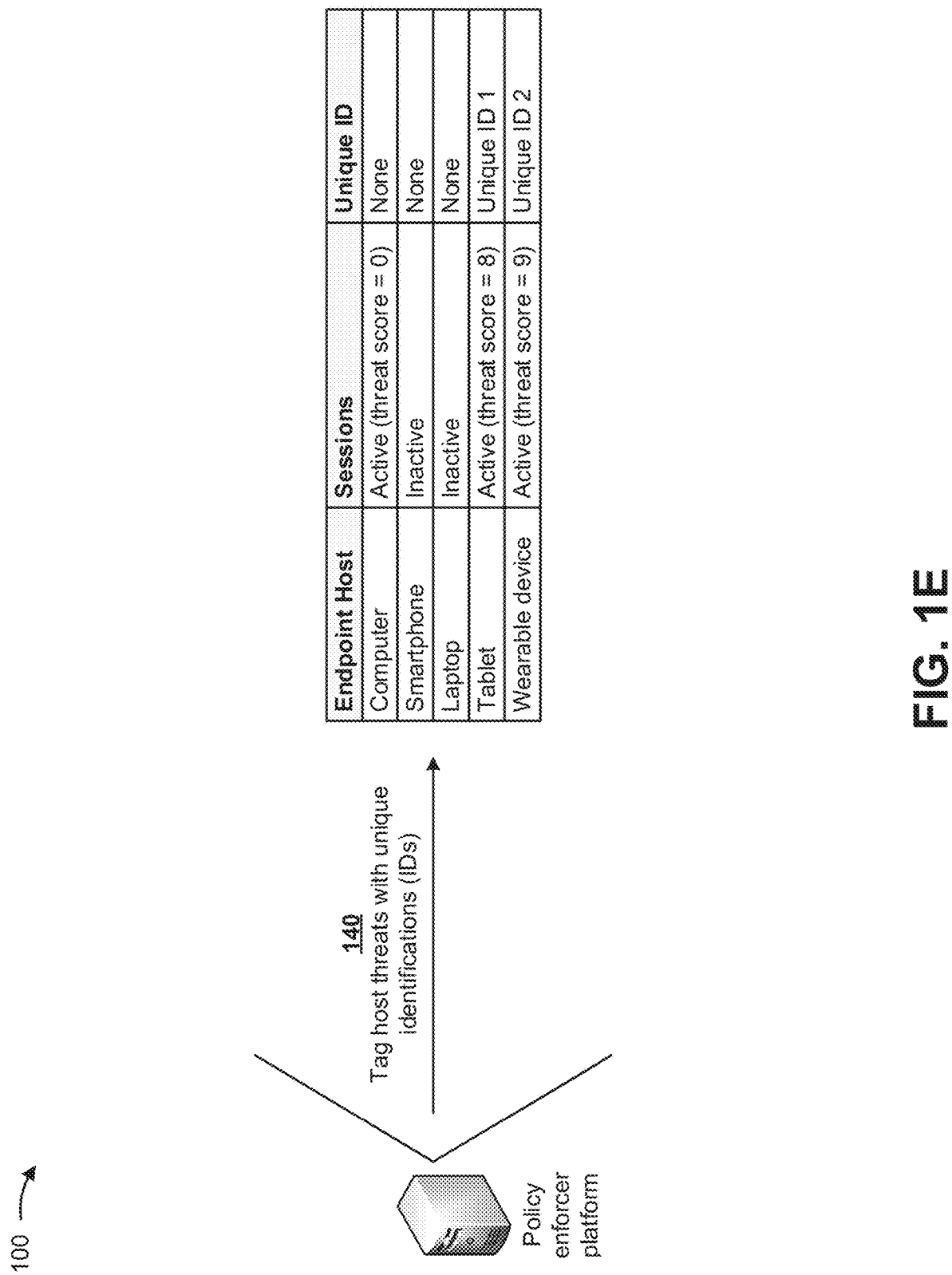

As shown in FIG. 1E, and by reference number 140, the policy enforcer platform may tag host threats with unique identifications (IDs). In some implementations, each unique ID may include a MAC address associated with a network interface card (NIC) associated with an endpoint host that represents a threat, session information (e.g., user login session details) associated with the endpoint host that represents a threat, a device identifier (e.g., a model number, a serial number, and/or the like) associated with the endpoint host that represents a threat, a combination of the aforementioned, and/or the like. In this way, the endpoint host that represents a threat may be tracked by the policy enforcer platform even when the endpoint host is assigned a different network address (e.g., IP address) based on where and how the endpoint host reattaches to a new network segment after a migration (e.g., a lateral migration) through the network.

In some implementations, as further shown in FIG. 1E, the policy enforcer platform may tag only those endpoint hosts that represent threats with the unique IDs. For example, since the tablet and the wearable device have active sessions with threat scores of eight and nine, respectively (e.g., as shown in FIG. 1C), the policy enforcer platform may tag the tablet and the wearable device with unique IDs (e.g., unique ID 1 and unique ID 2, respectively). This way the policy enforcer platform may track movement of the tablet and the wearable device through the network. In some implementations, the policy enforcer platform may add information identifying the unique IDs to the data structure that includes information identifying endpoint hosts and the sessions associated with the endpoint hosts (e.g., as shown in FIG. 1B).

As shown in FIG. 1F, and by reference number 145, the policy enforcer platform may monitor the host threat traffic across the network based on the unique IDs. In some implementations, the policy enforcer may automate monitoring and tracking of lateral propagation of endpoint hosts that represent threats across the network, and may continue to enforce actions against the endpoint hosts that represent threats (e.g., may monitor and/or enforce actions with respect to wired to wireless to wired session migrations and/or multi-vendor network segments). In some implementations, the policy enforcer may perform actions related to tracking and/or policy orchestration of endpoint hosts that represent threats based on tagging the endpoint hosts that represent threats with the unique IDs. The unique IDs may enable the policy enforcer platform to track an endpoint host that represents a threat even when the endpoint host is assigned a different network address (e.g., IP address) based on where and how the endpoint host reattaches to a new network segment after a migration through the network.

Figure 1G:
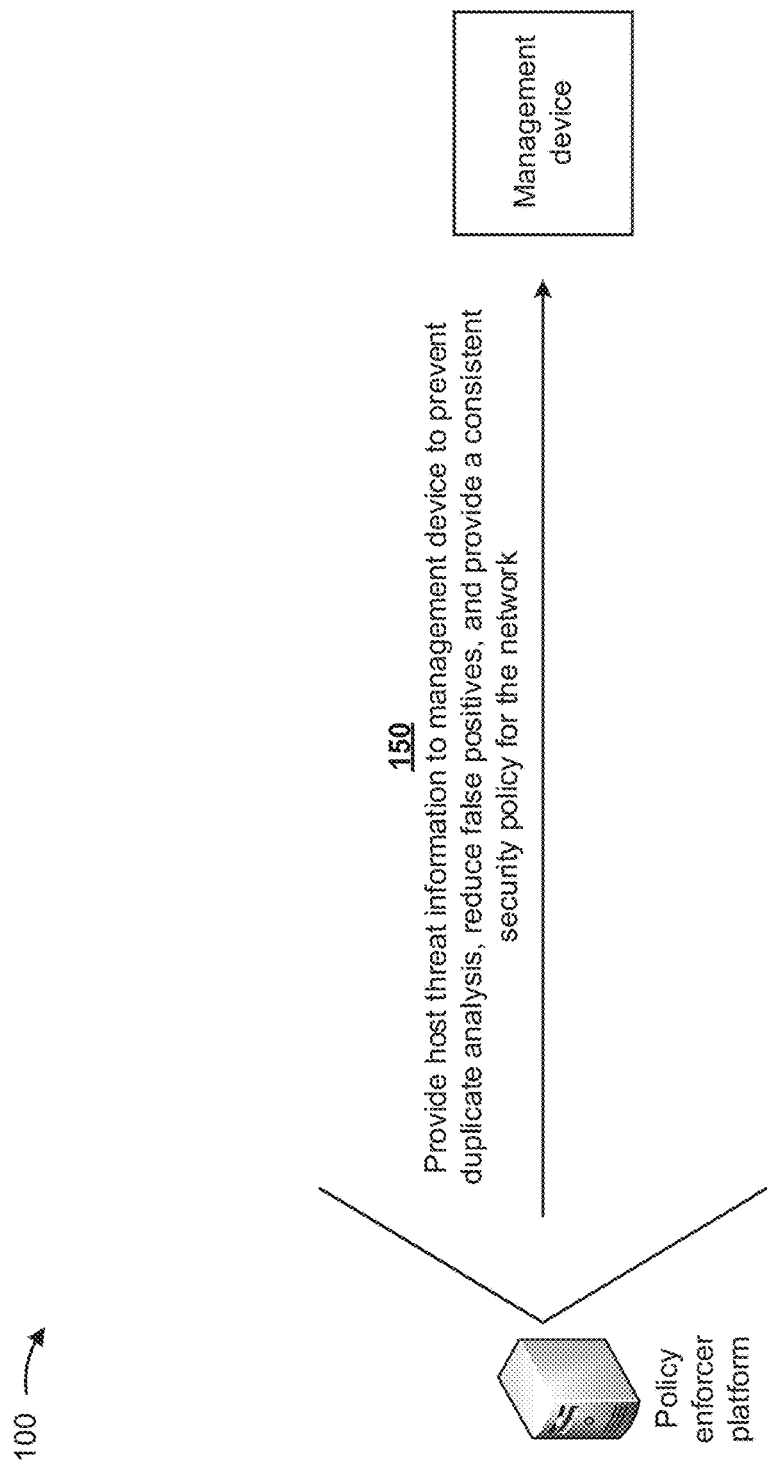

As shown in FIG. 1G, and by reference number 150, the policy enforcer platform may provide host threat information to the management device to mitigate duplicate analysis by the management device, to reduce false positive identification of endpoint hosts as threats by the management device, to provide a consistent security posture for the entire network, and/or the like. In some implementations, since the management device may monitor the network and enforce security policies for the network, the policy enforcer platform may provide, to the management device, the host threat information determined by the policy enforcer platform. In some implementations, the host threat information may include the information determined based on monitoring the host threat traffic across the network based on the unique IDs, as described above in connection with FIG. 1F.

Figure 1H:
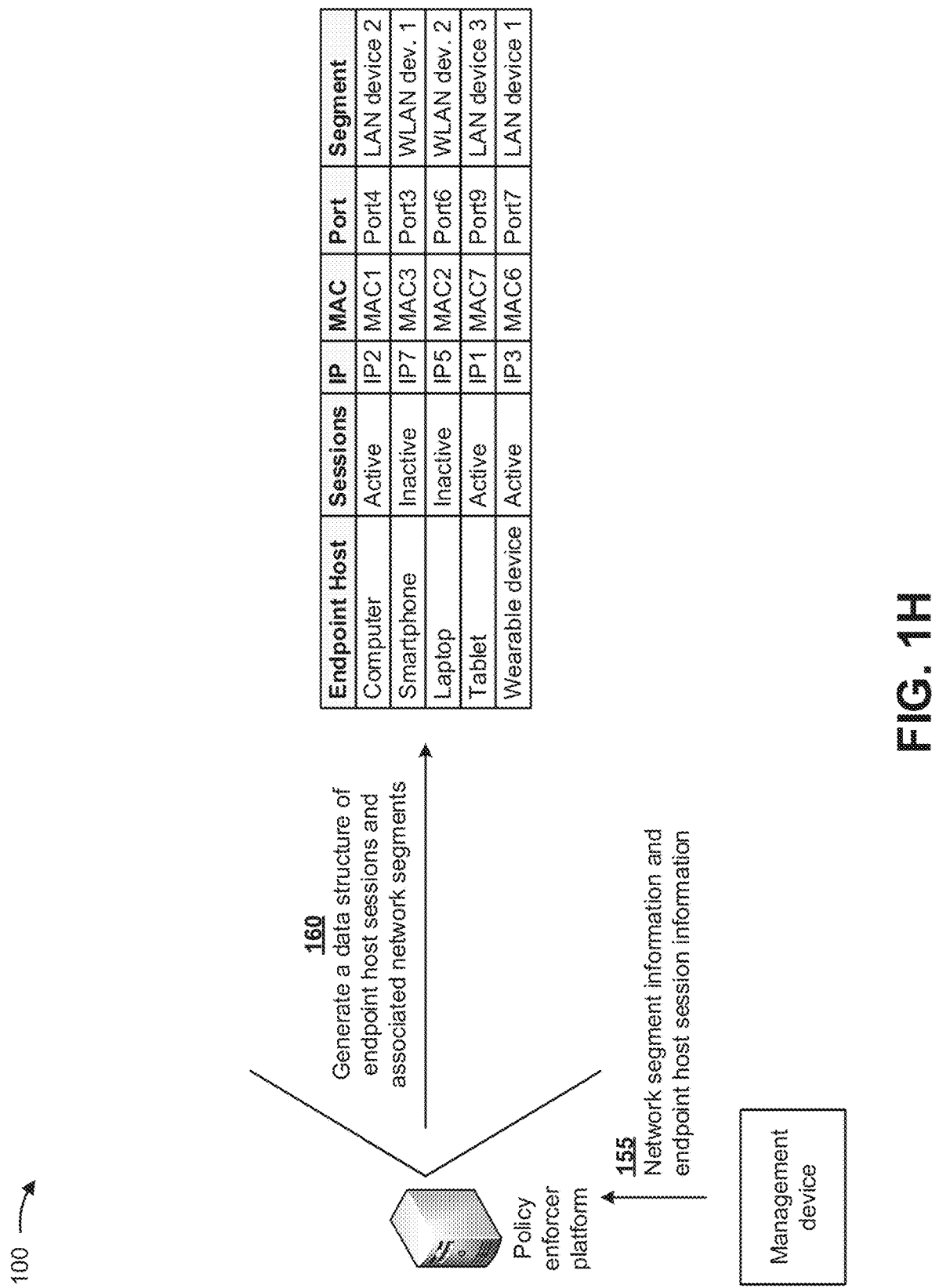
Figure 11:
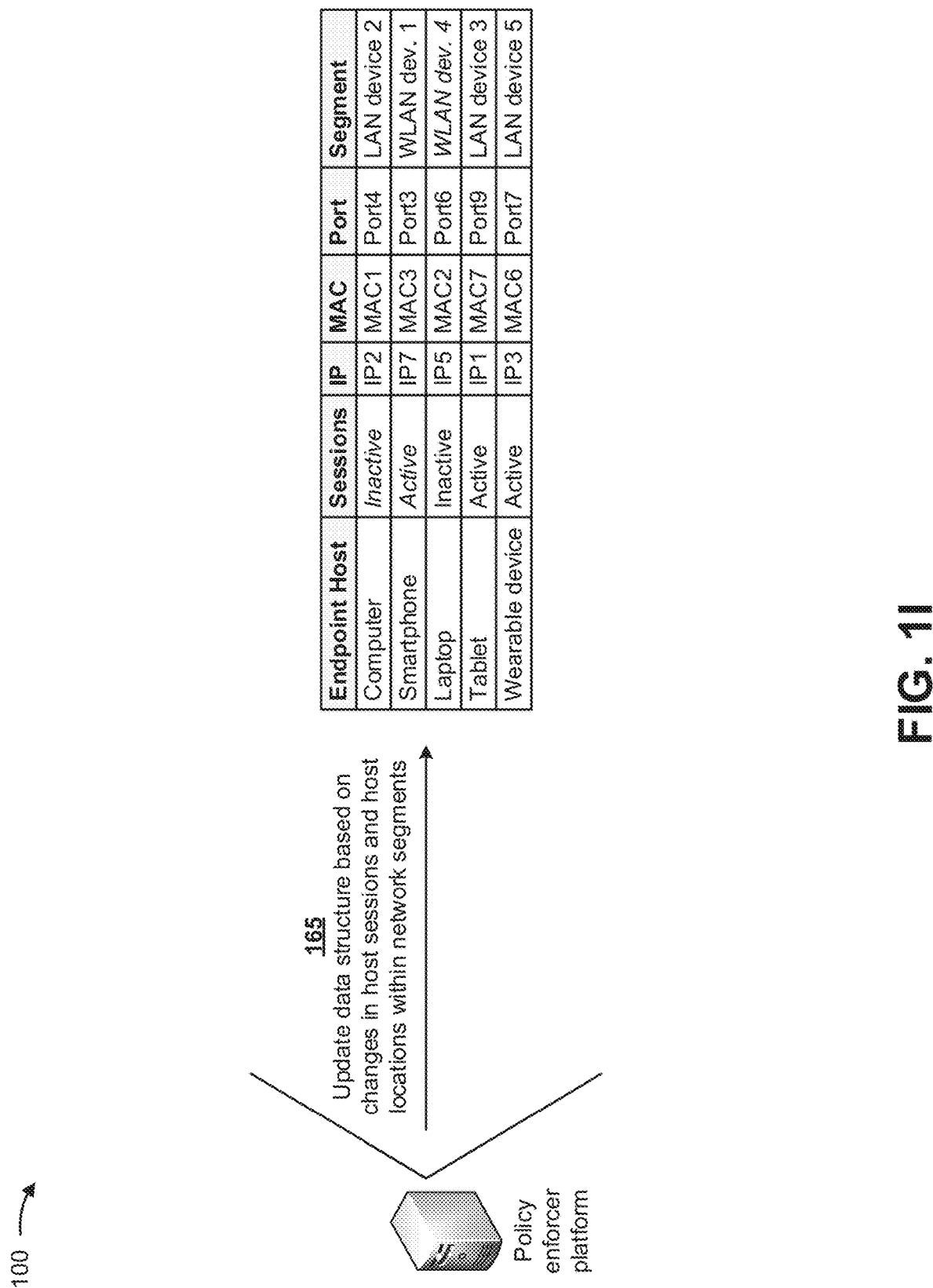

As shown in FIG. 1H, and by reference number 155, the policy enforcer platform may receive network segment information and endpoint host session information from the management device. In some implementations, the network segment information may include information identifying network segments of the network, such as LANs of the network, WLANs of the network, a collection of network devices of the network, and/or the like. In some implementations, the endpoint host session information may include information identifying endpoint hosts communicating with the network, sessions associated with the endpoint hosts, and/or the like.

In some implementations, the policy enforcer platform may not receive the network segment information and/or the endpoint host session information from the management device. In such implementations, the policy enforcer platform may dynamically determine the network segment information and/or the endpoint host session information based on the network topology information and/or the host threat feed information. For example, the policy enforcer platform may dynamically discover (e.g., based on the network topology information) network segments for layer 2 and layer 3 devices (e.g., of the open source interconnection (OSI) model), including network devices (e.g., switches, perimeter firewalls, and/or the like). In such implementations, the policy enforcer platform may utilize the network topology information and/or the host threat feed information to identify endpoint hosts (e.g., the user devices) connected to the network, and to determine sessions associated with the endpoint hosts.

As further shown in FIG. 1H, and by reference number 160, the policy enforcer platform may generate a data structure (e.g., a database, a table, a list, and/or the like) that includes information identifying endpoint host sessions and associated network segments, based on the network segment information and/or the endpoint host session information. For example, as further shown in FIG. 1H, the data structure may include information identifying endpoint hosts (e.g., a computer, a smartphone, a laptop, a tablet, a wearable device, and/or the like) and information identifying sessions of the endpoint hosts (e.g., active, inactive, and/or the like). In some implementations, the policy enforcer platform may utilize the network segment information and/or the endpoint host session information to determine network address information (e.g., an IP address, a MAC address, a port identifier, and/or the like) associated with the endpoint hosts, and may store information identifying the network address information associated with the endpoint hosts in the data structure.

In some implementations, the policy enforcer platform may utilize the network segment information and/or the endpoint host session information to determine network segments associated with the endpoint hosts, and may store information identifying the network segments associated with the endpoint hosts in the data structure.

For example, as further shown in FIG. 1H, the data structure may include information identifying endpoint hosts (e.g., a computer, a smartphone, a laptop, a tablet, a wearable device, and/or the like), sessions associated with the endpoint hosts (e.g., active or inactive), IP addresses associated with the endpoint hosts (e.g., IP2, IP7, IP5, IP1, IP3, and/or the like), MAC addresses associated with the endpoint hosts (e.g., MAC1, MAC3, MAC2, MAC7, MAC6, and/or the like), port identifiers associated with the endpoint hosts (e.g., port4, port3, port6, port9, port7, and/or the like), network segments associated with the endpoint hosts (e.g., LAN device 2, WLAN device 1, WLAN device 2, LAN device 3, LAN device 1, and/or the like), and/or the like.

As shown in FIG. 1I, and by reference number 165, the policy enforcer platform may update the data structure based on changes in host sessions and/or based on movement of endpoint hosts across or within network segments. In some implementations, the policy enforcer platform may periodically refresh the information in the data structure based on detected changes in session states. For example, as further shown in FIG. 1I, if the policy enforcer platform detects that the host session for the computer changes from active to inactive, and that the host session for the smartphone changes from inactive to active, the policy enforcer platform may update the data structure to reflect such changes.

In some implementations, the policy enforcer platform may maintain, in the data structure, information that identifies movement of endpoint hosts across or within network segments. For example, as further shown in FIG. 1I, if the policy enforcer platform detects that the laptop moves from WLAN device 2 to WLAN device 4, and that the wearable device moves from LAN device 1 to LAN device 5, the policy enforcer platform may update the data structure to reflect such movements.

In some implementations, for a network with particular wired access switches and/or wireless networks, the policy enforcer platform may dynamically integrate with various supported third-party control systems in order to enhance information provided in the data structure, such as information related to network segments and/or endpoint host sessions. In some implementations, the policy enforcer platform may continuously track lateral movement of an endpoint host threat across the network and may maintain an original threat policy action for the endpoint host threat across the network. For example, for an endpoint host threat, with threat policy actions enforced, the policy enforcer platform may maintain the unique ID for the endpoint host threat in order to track the endpoint host threat. In some implementations, the policy enforcer platform may bind with an original IP address of the endpoint host threat, and may periodically query endpoint host threat sessions to determine changes in a location of the endpoint host threat within a network segment.

Figure 1J:
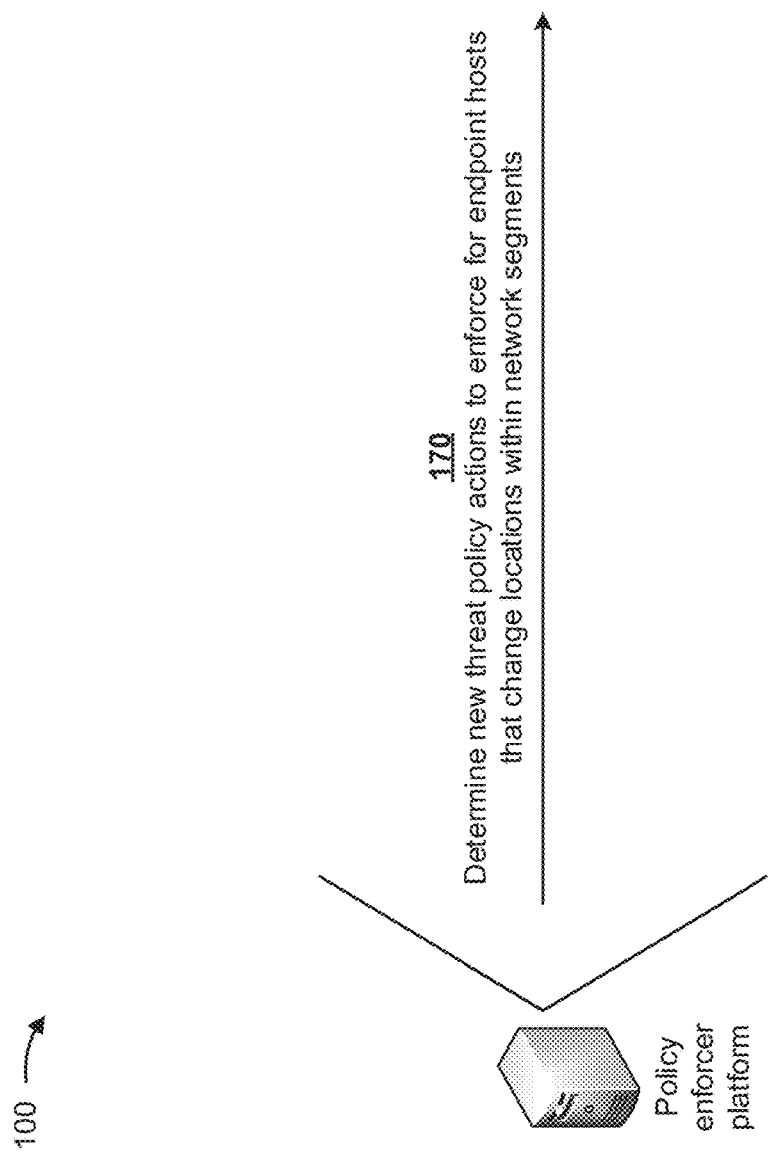

As shown in FIG. 1J, and by reference number 170, the policy enforcer platform may determine new threat policy actions to enforce for endpoint hosts that change locations within network segments. In some implementations, any changes in a location of an endpoint host within a network segment may trigger an automatic enforcement of a new threat policy action. In some implementations, the policy enforcer platform may determine a new policy action based on a movement of an endpoint host across or within network segments. For example, if the endpoint host moves from a LAN of the network to a WLAN of the network, the policy enforcer platform may determine that such movement indicates a particular type of threat, and may enforce a new threat policy action that combats the particular type of threat. In another example, the policy enforcer platform may determine that movement to the WLAN of the network requires a new threat policy action designed to handle threats in a WLAN rather than a LAN.

In some implementations, the policy enforcer platform may provide (e.g., to the management device) information identifying endpoint host threats, movement of endpoint host threats, and/or the like, so that the management device may make intelligent decisions to update the threat feeds with current unique host IDs, to reduce duplication of threat feeds for a same endpoint host, and/or the like.

Figure 1K:
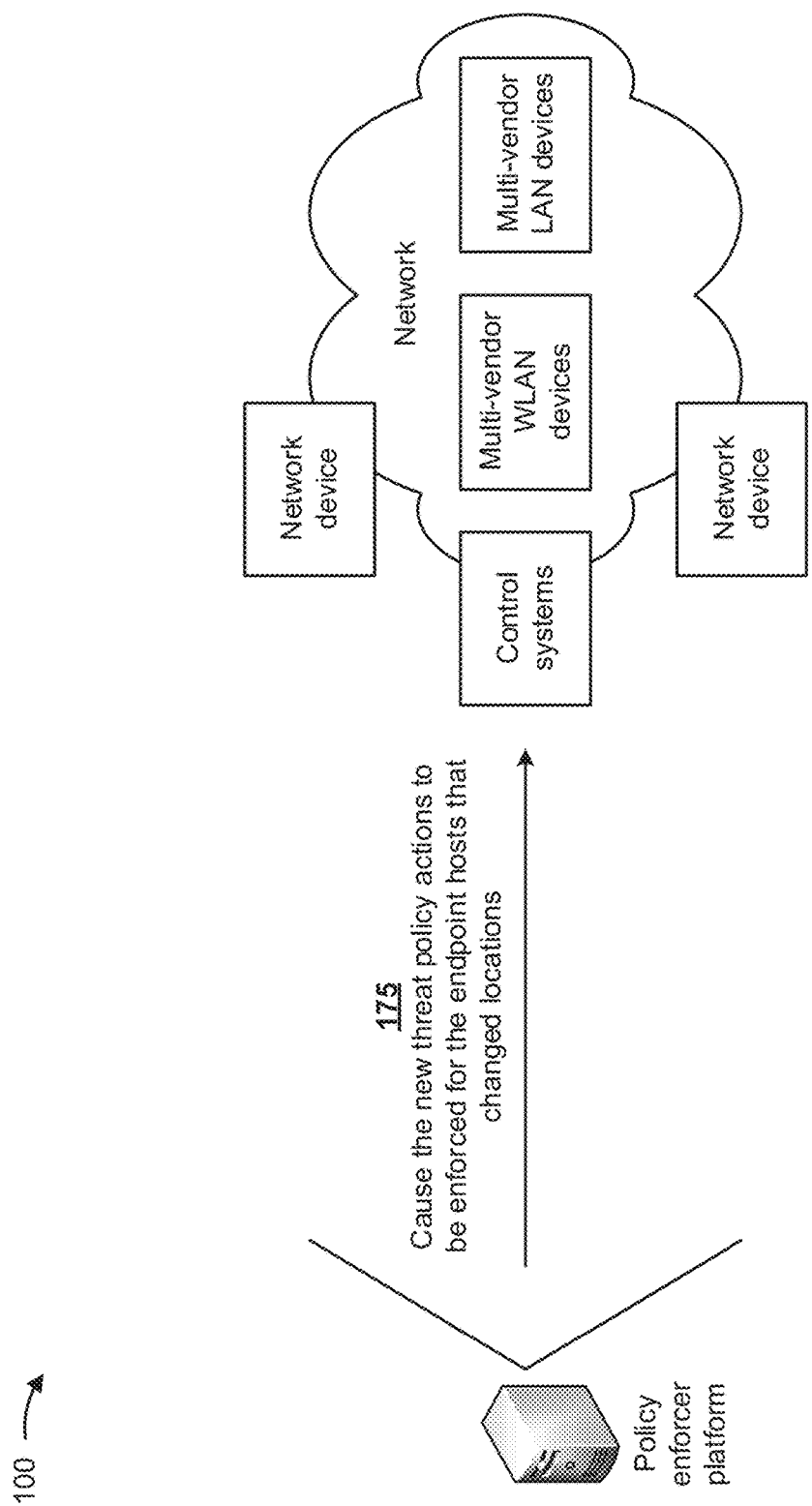

As shown in FIG. 1K, and by reference number 175, the policy enforcer platform may cause the new threat policy actions to be enforced for the endpoint hosts that changed locations. In some implementations, the policy enforcer platform may provide, to the control systems associated with the endpoint hosts that changed locations, information indicating that network elements associated with the control systems are to enforce the new threat policy actions. In such implementations, the control systems may provide, to the network elements associated with the control systems, instructions to enforce the new threat policy actions. The network elements associated with the control systems may receive the instructions, and may enforce the new threat policy actions based on the instructions. In some implementations, the new threat policy actions may include dropping traffic from the endpoint hosts that changed locations, quarantining traffic from the endpoint hosts that changed locations, logging traffic from the endpoint hosts that changed locations for further analysis, redirecting traffic from the endpoint hosts that changed locations to a device that may perform a deeper analysis of the traffic, and/or the like.

Some implementations described herein may relate to host threat movement issues in a multi-vendor network. Additionally, or alternatively, some implementations described herein may relate to host threat policy orchestration for a given IP feed generated by an endpoint host. Additionally, or alternatively, some implementations described herein may provide a way to uniquely identify an endpoint host in a network, such as when a host threat feed identifies, by IP address, multiple endpoint hosts with a same IP address as potentially risky (e.g., which may be needed for threat remediation).

Some implementations described herein may identify a particular endpoint host session (e.g., based on an IP address in a threat feed) in a particular network segment. Additionally, or alternatively, some implementations described herein may associate a particular policy action for an endpoint host group and may enforce the policy action on a particular control system. For example, a threat feed may identify an IP address as being a threat, and based on this IP address, some implementations described herein may identify a correct endpoint host for enforcing a policy action based on a unique ID for the endpoint host. In this way, some implementations described herein are capable of enforcing a policy action against an endpoint host, regardless of whether the IP address of the endpoint host has changed or will change (e.g., due to disconnecting from a network and reconnecting to the network, migrating through the network, etc.).

Additionally, or alternatively, in an enterprise network or a campus-branch deployment (e.g., where branch networks are configured with similar IP addressing schemes with overlapping IP addresses), the policy enforcer platform may create a secure group of network elements to uniquely associate with a branch network and may dynamically determine correct endpoint hosts to enforce threat remediation actions that match an IP address of a threat host feed for a specific secure group of network elements. This may prevent the policy enforcer platform from enforcing policy actions for an incorrect endpoint session when there are multiple endpoint sessions active for the same IP address.

In this way, several different stages of the process for tracking host threats in a network and enforcing threat policy actions for the host threats may be automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to track host threats in a network and enforce threat policy actions for the host threats. Finally, automating the process for tracking host threats in a network and enforcing threat policy actions for the host threats conserves computing resources (e.g., processor resources, memory resources, and/or the like) that would otherwise be wasted in attempting to combat host threats across a network.

As indicated above, FIGS. 1A-1K are provided merely as examples. Other examples are possible and may differ from what was described with regard to FIGS. 1A-1K.

Figure 2:
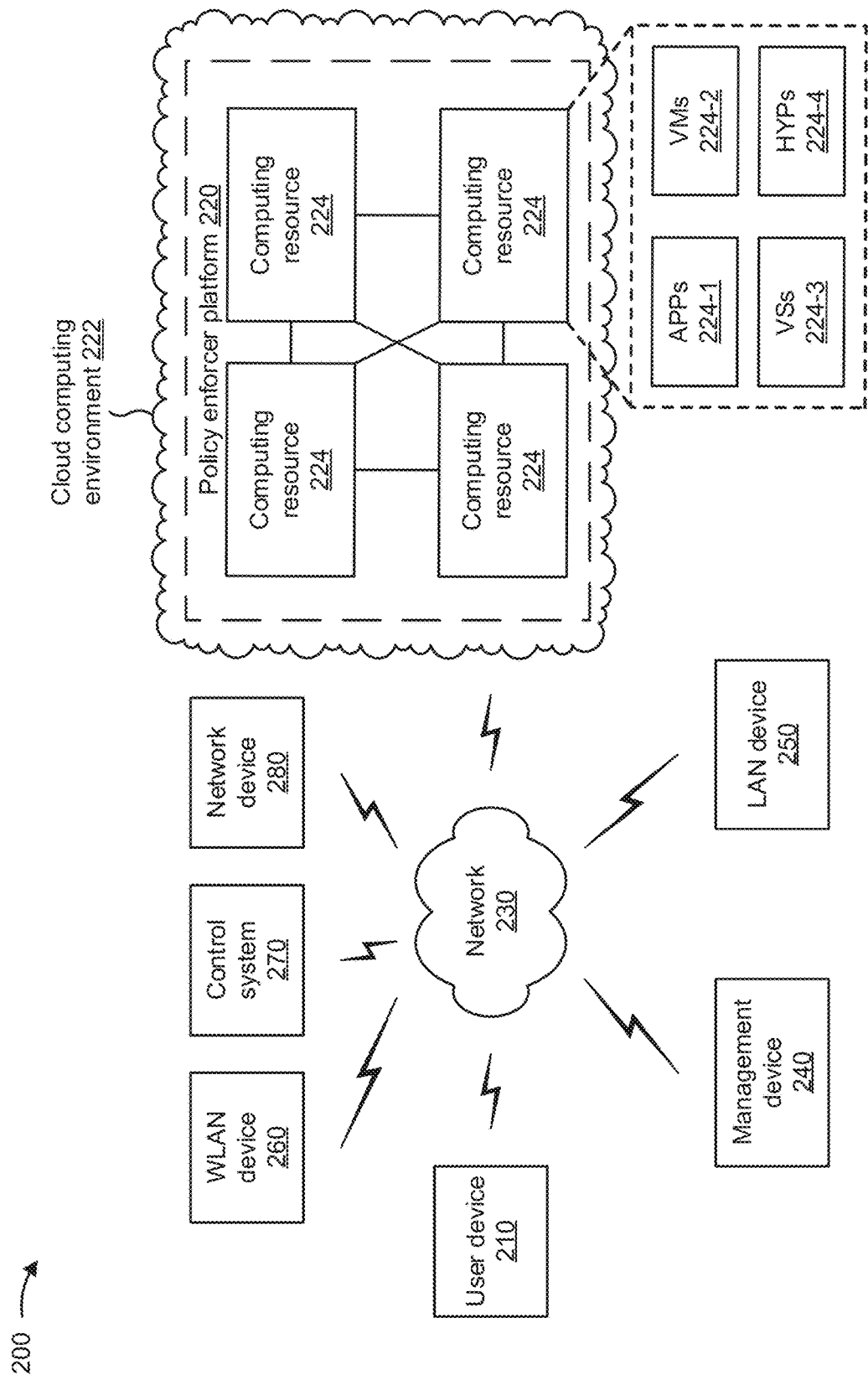
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a policy enforcer platform 220, a network 230, a management device 240, a LAN device 250, a WLAN device 260, a control system 270, and a network device 280. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to one or more other devices of environment 200.

Policy enforcer platform 220 includes one or more devices capable of tracking host threats in a network and enforcing threat policy actions for the host threats. In some implementations, policy enforcer platform 220 may be designed to be modular such that certain software components may be swapped in or out depending on a particular need. As such, policy enforcer platform 220 may be easily and/or quickly reconfigured for different uses. In some implementations, policy enforcer platform 220 may receive information from and/or transmit information to one or more other devices of environment 200.

In some implementations, as shown, policy enforcer platform 220 may be hosted in a cloud computing environment 222. Notably, while implementations described herein describe policy enforcer platform 220 as being hosted in cloud computing environment 222, in some implementations, policy enforcer platform 220 may not be cloud-based (i.e., may be implemented outside of a cloud computing environment, such as within one or more server devices) or may be partially cloud-based.

Cloud computing environment 222 includes an environment that hosts policy enforcer platform 220. Cloud computing environment 222 may provide computation, software, data access, storage, etc. services that do not require end-user knowledge of a physical location and configuration of system(s) and/or device(s) that hosts policy enforcer platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host policy enforcer platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with policy enforcer platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of policy enforcer platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Management device 240 includes one or more devices capable of receiving, generating, storing, processing, and/or providing information described herein. For example, management device 240 may include a server (e.g., in a data center or a cloud computing environment), a data center (e.g., a multi-server micro data center), a workstation computer, a VM provided in a cloud computing environment, or a similar type of device. In some implementations, management device 240 may receive information from and/or provide information to one or more other devices of environment 200. In some implementations, management device 240 may be a physical device implemented within a housing, such as a chassis. In some implementations, management device 240 may be a virtual device implemented by one or more computer devices of a cloud computing environment or a data center. In some implementations, management device 240 may identify host threat feeds generated by endpoint hosts (e.g., user devices 210), and may analyze and/or manage the host threat feeds.

LAN device 250 includes one or more devices capable of receiving, generating, storing, processing, and/or providing information described herein. For example, LAN device 250 may include a network device (e.g., as described herein), a user device (e.g., as described herein), a server device, and/or the like. In some implementations, LAN device 250 may receive information from and/or provide information to one or more other devices of environment 200. In some implementations, LAN device 250 may be a physical device implemented within a housing, such as a chassis. In some implementations, LAN device 250 may be a virtual device implemented by one or more computer devices of a cloud computing environment or a data center.

WLAN device 260 includes one or more devices capable of receiving, generating, storing, processing, and/or providing information described herein. For example, WLAN device 260 may include a network device (e.g., as described herein), a user device (e.g., as described herein), a server device, and/or the like. In some implementations, WLAN device 260 may receive information from and/or provide information to one or more other devices of environment 200. In some implementations, WLAN device 260 may be a physical device implemented within a housing, such as a chassis. In some implementations, WLAN device 260 may be a virtual device implemented by one or more computer devices of a cloud computing environment or a data center.

Control system 270 includes one or more devices capable of receiving, generating, storing, processing, and/or providing information described herein. For example, control system 270 may include a server (e.g., in a data center or a cloud computing environment), a data center (e.g., a multi-server micro data center), a workstation computer, a VM provided in a cloud computing environment, or a similar type of device. In some implementations, control system 270 may receive information from and/or provide information to one or more other devices of environment 200. In some implementations, control system 270 may be a physical device implemented within a housing, such as a chassis. In some implementations, control system 270 may be a virtual device implemented by one or more computer devices of a cloud computing environment or a data center. In some implementations, control system 270 may include an element management system (EMS) that manages network elements (e.g., LAN devices 250, WLAN devices 260, network devices 280, and/or the like), and performs fault management, configuration, accounting, performance and security, and/or the like.

Network device 280 includes one or more devices (e.g., one or more traffic transfer devices) capable of receiving, providing, storing, generating, and/or processing information described herein. For example, network device 280 may include a firewall, a router, a policy enforcer, a gateway, a switch, a hub, a bridge, a reverse proxy, a server (e.g., a proxy server), a security device, an intrusion detection device, a load balancer, or a similar device. In some implementations, network device 280 may receive information from and/or provide information to one or more other devices of environment 200. In some implementations, network device 280 may be a physical device implemented within a housing, such as a chassis. In some implementations, network device 280 may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
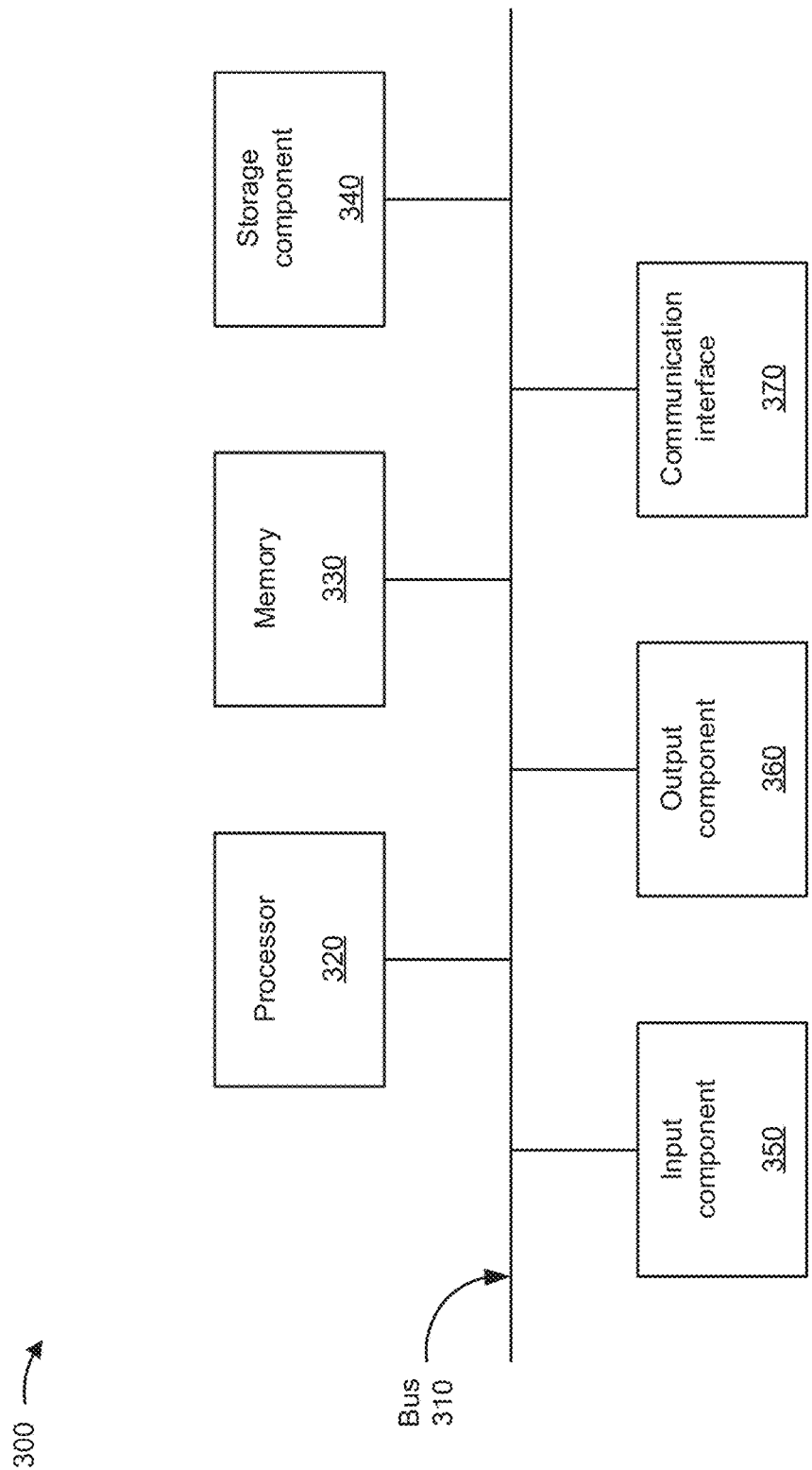
FIG. 3 is a diagram of example components of one or more devices of FIG. 2.

FIG. 3 is a diagram of example components of a device 300. Device 300 may correspond to user device 210, policy enforcer platform 220, computing resource 224, management device 240, LAN device 250, WLAN device 260, control system 270, and/or network device 280. In some implementations, user device 210, policy enforcer platform 220, computing resource 224, management device 240, LAN device 250, WLAN device 260, control system 270, and/or network device 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
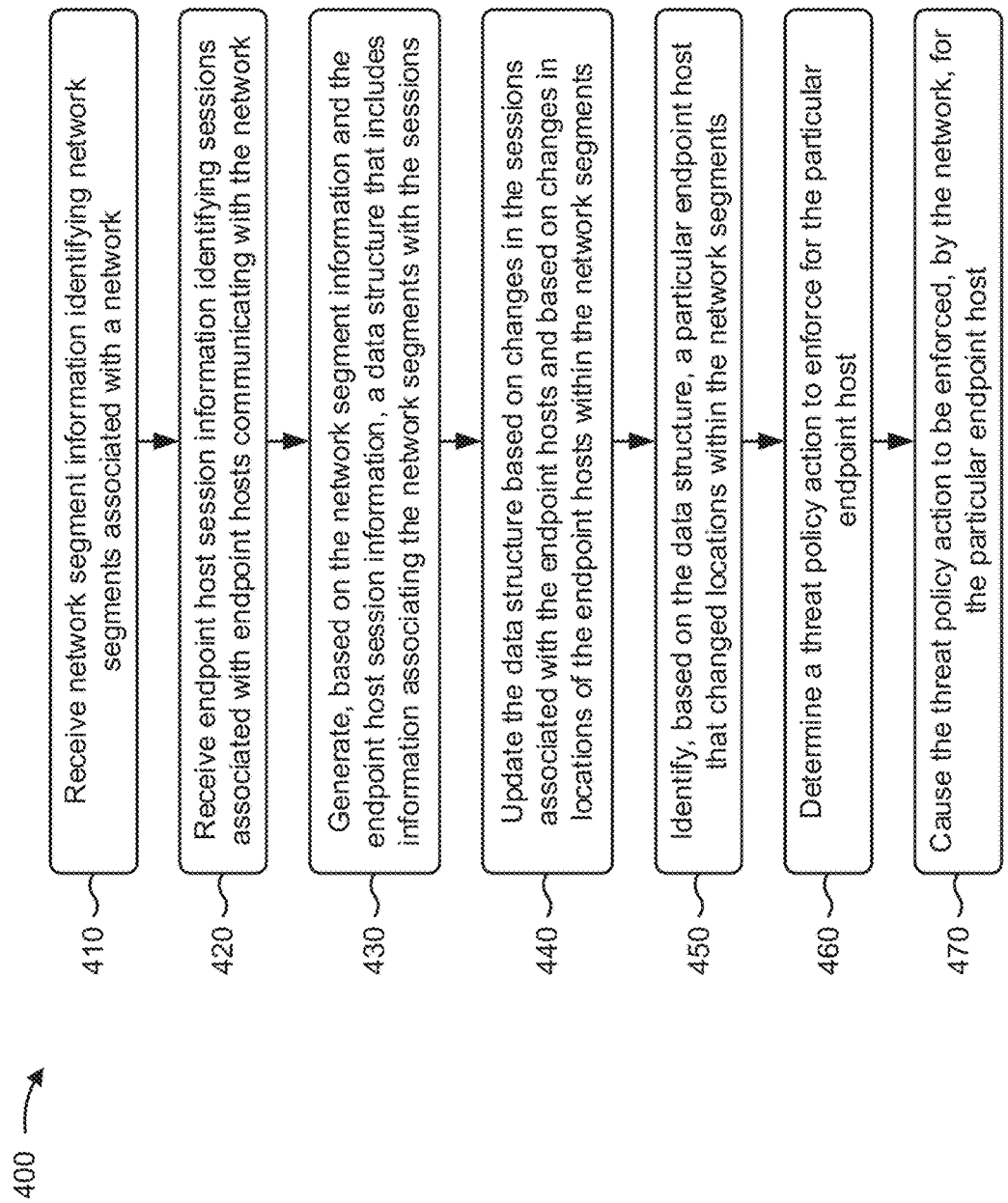
FIG. 4 is a flow chart of an example process for tracking host threats in a network and enforcing threat policy actions for the host threats.

FIG. 4 is a flow chart of an example process 400 for tracking host threats in a network and enforcing threat policy actions for the host threats. In some implementations, one or more process blocks of FIG. 4 may be performed by a policy enforcer platform (e.g., policy enforcer platform 220). In some implementations, one or more process blocks of FIG. 4 may be performed by another device or a group of devices separate from or including policy enforcer platform 220, such as management device 240 and/or control system 270.

As shown in FIG. 4, process 400 may include receiving network segment information identifying network segments associated with a network (block 410). For example, the policy enforcer platform (e.g., using computing resource 224, processor 320, communication interface 370, and/or the like) may receive network segment information identifying network segments associated with a network, as described above in connection with FIGS. 1A-2.

As further shown in FIG. 4, process 400 may include receiving endpoint host session information identifying sessions associated with endpoint hosts communicating with the network (block 420). For example, the policy enforcer platform (e.g., using computing resource 224, processor 320, communication interface 370, and/or the like) may receive endpoint host session information identifying sessions associated with endpoint hosts communicating with the network, as described above in connection with FIGS. 1A-2.

As further shown in FIG. 4, process 400 may include generating, based on the network segment information and the endpoint host session information, a data structure that includes information associating the network segments with the sessions associated with the endpoint hosts (block 430). For example, the policy enforcer platform (e.g., using computing resource 224, processor 320, storage component 340, and/or the like) may generate, based on the network segment information and the endpoint host session information, a data structure that includes information associating the network segments with the sessions associated with the endpoint hosts, as described above in connection with FIGS. 1A-2.

As further shown in FIG. 4, process 400 may include updating the data structure based on changes in the sessions associated with the endpoint hosts and based on changes in locations of the endpoint hosts within the network segments (block 440). For example, the policy enforcer platform (e.g., using computing resource 224, processor 320, memory 330, and/or the like) may update the data structure based on changes in the sessions associated with the endpoint hosts and based on changes in locations of the endpoint hosts within the network segments, as described above in connection with FIGS. 1A-2.

As further shown in FIG. 4, process 400 may include identifying, based on the data structure, a particular endpoint host, of the endpoint hosts, that changed locations within the network segments (block 450). For example, the policy enforcer platform (e.g., using computing resource 224, processor 320, storage component 340, and/or the like) may identify, based on the data structure, a particular endpoint host, of the endpoint hosts, that changed locations within the network segments, as described above in connection with FIGS. 1A-2.

As further shown in FIG. 4, process 400 may include determining a threat policy action to enforce for the particular endpoint host (block 460). For example, the policy enforcer platform (e.g., using computing resource 224, processor 320, memory 330, and/or the like) may determine a threat policy action to enforce for the particular endpoint host, as described above in connection with FIGS. 1A-2.

As further shown in FIG. 4, process 400 may include causing the threat policy action to be enforced, by the network, for the particular endpoint host (block 470). For example, the policy enforcer platform (e.g., using computing resource 224, processor 320, communication interface 370, and/or the like) may cause the threat policy action to be enforced, by the network, for the particular endpoint host, as described above in connection with FIGS. 1A-2.

Process 400 may include additional implementations, such as any single implementation or any combination of implementations described below and/or in connection with one or more other processes described elsewhere herein.

In some implementations, the policy enforcer platform may receive network topology information associated with the network, and may generate, based on the network topology information, another data structure that includes information identifying capabilities of each network element of the network. In some implementations, when causing the threat policy action to be enforced, the policy enforcer platform may cause the threat policy action to be enforced, by one or more of the network elements of the network, based on the other data structure.

In some implementations, the policy enforcer platform may receive host threat feed information associated with the endpoint hosts, and may add, to the data structure and based on the host threat feed information, information identifying host threat feeds associated with the endpoint hosts.

In some implementations, the policy enforcer platform may identify network control systems associated with the endpoint hosts, and may add, to the data structure, information identifying the network control systems associated with the endpoint hosts. In some implementations, when causing the threat policy action to be enforced, the policy enforcer platform may cause the threat policy action to be enforced, by one or more of the network control systems, based on the data structure.

In some implementations, the policy enforcer platform may receive host threat feed information associated with the endpoint hosts, may cause, based on the host threat feed information and based on the threat policy action, host threat traffic external to the network to be blocked at a perimeter network element of the network, and may cause, based on the host threat feed information and based on the threat policy action, host threat traffic internal to the network to be blocked at a switching layer of the network.

In some implementations, the policy enforcer platform may receive host threat feed information associated with the endpoint hosts, and may tag host threats, identified by the host threat feed information, with particular identifications. In some implementations, when determining the threat policy action, the policy enforcer platform may determine the threat policy action based on a particular identification, of the particular identifications, associated with the particular endpoint host. In some implementations, the policy enforcer platform may monitor host threat traffic across the network based on the particular identifications.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
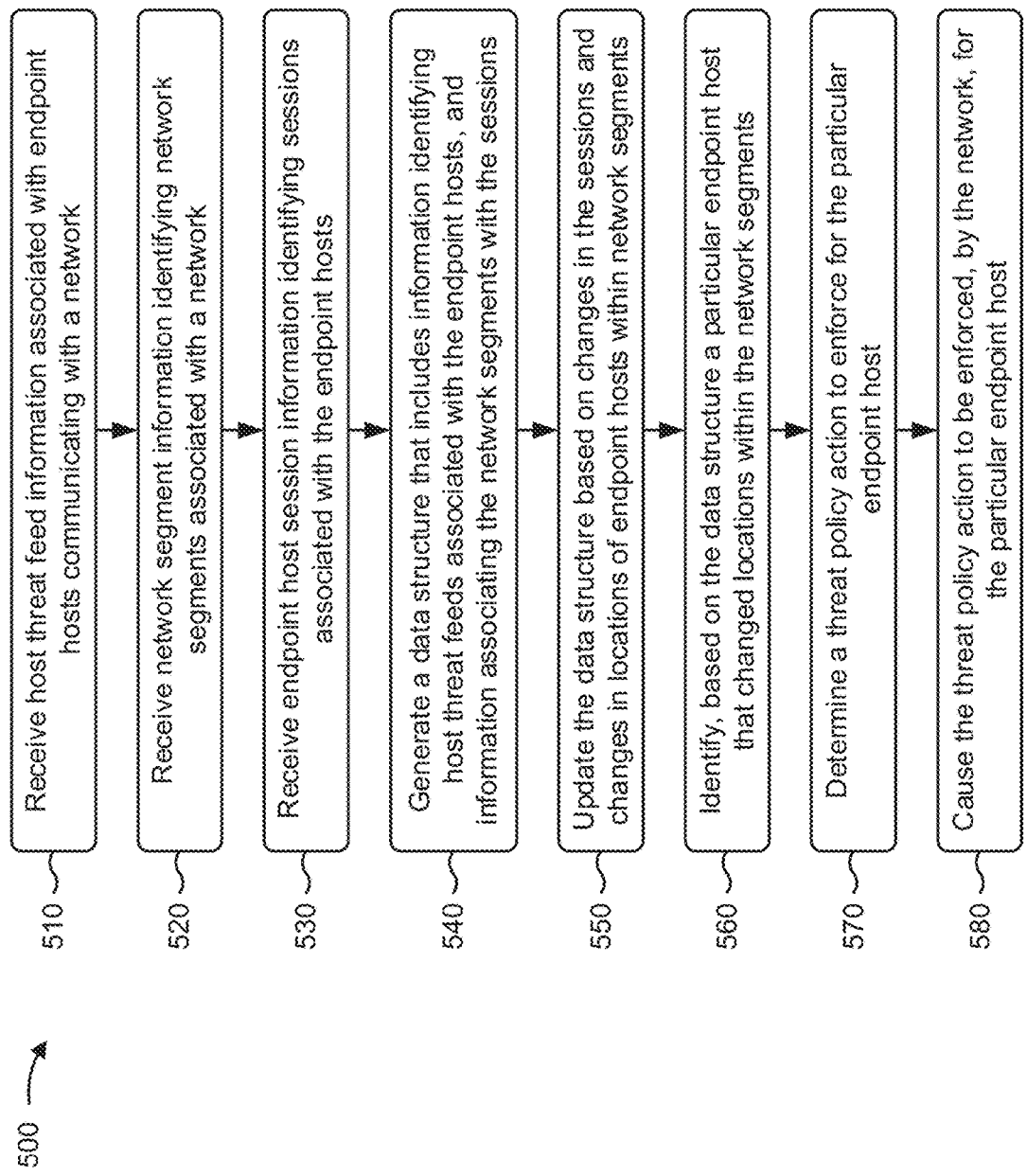
FIG. 5 is a flow chart of an example process for tracking host threats in a network and enforcing threat policy actions for the host threats.

FIG. 5 is a flow chart of an example process 500 for tracking host threats in a network and enforcing threat policy actions for the host threats. In some implementations, one or more process blocks of FIG. 5 may be performed by a policy enforcer platform (e.g., policy enforcer platform 220). In some implementations, one or more process blocks of FIG. 5 may be performed by another device or a group of devices separate from or including policy enforcer platform 220, such as management device 240 and/or control system 270.

As shown in FIG. 5, process 500 may include receiving host threat feed information associated with endpoint hosts communicating with a network (block 510). For example, the policy enforcer platform (e.g., using computing resource 224, processor 320, communication interface 370, and/or the like) may receive host threat feed information associated with endpoint hosts communicating with a network, as described above in connection with FIGS. 1A-2.

As further shown in FIG. 5, process 500 may include receiving network segment information identifying network segments associated with a network (block 520). For example, the policy enforcer platform (e.g., using computing resource 224, processor 320, communication interface 370, and/or the like) may receive network segment information identifying network segments associated with a network, as described above in connection with FIGS. 1A-2.

As further shown in FIG. 5, process 500 may include receiving endpoint host session information identifying sessions associated with the endpoint hosts (block 530). For example, the policy enforcer platform (e.g., using computing resource 224, processor 320, communication interface 370, and/or the like) may receive endpoint host session information identifying sessions associated with the endpoint hosts, as described above in connection with FIGS. 1A-2.

As further shown in FIG. 5, process 500 may include generating, based on the host threat feed information, the network segment information, and the endpoint host session information, a data structure that includes information identifying host threat feeds associated with the endpoint hosts, and information associating the network segments with the sessions associated with the endpoint hosts (block 540). For example, the policy enforcer platform (e.g., using computing resource 224, processor 320, memory 330, and/or the like) may generate, based on the host threat feed information, the network segment information, and the endpoint host session information, a data structure that includes information identifying host threat feeds associated with the endpoint hosts, and information associating the network segments with the sessions associated with the endpoint hosts, as described above in connection with FIGS. 1A-2.

As further shown in FIG. 5, process 500 may include updating the data structure based on changes in the sessions associated with the endpoint hosts and based on changes in locations of the endpoint hosts within the network segments (block 550). For example, the policy enforcer platform (e.g., using computing resource 224, processor 320, storage component 340, and/or the like) may update the data structure based on changes in the sessions associated with the endpoint hosts and based on changes in locations of the endpoint hosts within the network segments, as described above in connection with FIGS. 1A-2.

As further shown in FIG. 5, process 500 may include identifying, based on the data structure, a particular endpoint host, of the endpoint hosts, that changed locations within the network segments (block 560). For example, the policy enforcer platform (e.g., using computing resource 224, processor 320, memory 330, and/or the like) may identify, based on the data structure, a particular endpoint host, of the endpoint hosts, that changed locations within the network segments, as described above in connection with FIGS. 1A-2.

As further shown in FIG. 5, process 500 may include determining a threat policy action to enforce for the particular endpoint host (block 570). For example, the policy enforcer platform (e.g., using computing resource 224, processor 320, storage component 340, and/or the like) may determine a threat policy action to enforce for the particular endpoint host, as described above in connection with FIGS. 1A-2.

As further shown in FIG. 5, process 500 may include causing the threat policy action to be enforced, by the network, for the particular endpoint host (block 580). For example, the policy enforcer platform (e.g., using computing resource 224, processor 320, communication interface 370, and/or the like) may cause the threat policy action to be enforced, by the network, for the particular endpoint host, as described above in connection with FIGS. 1A-2.

Process 500 may include additional implementations, such as any single implementation or any combination of implementations described below and/or in connection with one or more other processes described elsewhere herein.

In some implementations, the host threat feed information may include information associated with malware. In some implementations, the policy enforcer platform may receive network topology information associated with the network, and may generate, based on the network topology information, another data structure that includes information identifying capabilities of each network element of the network. In some implementations, when causing the threat policy action to be enforced, the policy enforcer platform may cause the threat policy action to be enforced, by one or more of the network elements of the network, based on the other data structure.

In some implementations, the policy enforcer platform may identify network control systems associated with the endpoint hosts, and may add, to the data structure, information identifying the network control systems associated with the endpoint hosts. In some implementations, when causing the threat policy action to be enforced, the policy enforcer platform may cause the threat policy action to be enforced, by one or more of the network control systems, based on the data structure.

In some implementations, the policy enforcer platform may cause, based on the host threat feed information and based on the threat policy action, host threat traffic external to the network to be blocked at a perimeter network element of the network, and may cause, based on the host threat feed information and based on the threat policy action, host threat traffic internal to the network to be blocked at a switching layer of the network.

In some implementations, the policy enforcer platform may tag host threats, identified by the host threat feed information, with particular identifications, each of the particular identifications being based on a media access control (MAC) address, session information, and/or a hardware identifier associated with one of the endpoint hosts. In some implementations, when determining the threat policy action, the policy enforcer platform may determine the threat policy action based on a particular identification, of the particular identifications, associated with the particular endpoint host. In some implementations, the policy enforcer platform may monitor host threat traffic across the network based on the particular identifications, and may provide information associated with the host threat traffic to a management device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for tracking host threats in a network and enforcing threat policy actions for the host threats. In some implementations, one or more process blocks of FIG. 6 may be performed by a policy enforcer platform (e.g., policy enforcer platform 220). In some implementations, one or more process blocks of FIG. 6 may be performed by another device or a group of devices separate from or including policy enforcer platform 220, such as management device 240 and/or control system 270.

As shown in FIG. 6, process 600 may include receiving network topology information identifying capabilities of network elements of a network (block 610). For example, the policy enforcer platform (e.g., using computing resource 224, processor 320, communication interface 370, and/or the like) may receive network topology information identifying capabilities of network elements of a network, as described above in connection with FIGS. 1A-2.

As further shown in FIG. 6, process 600 may include receiving network segment information identifying network segments associated with the network (block 620). For example, the policy enforcer platform (e.g., using computing resource 224, processor 320, communication interface 370, and/or the like) may receive network segment information identifying network segments associated with the network, as described above in connection with FIGS. 1A-2.

As further shown in FIG. 6, process 600 may include receiving endpoint host session information identifying sessions associated with endpoint hosts communicating with the network (block 630). For example, the policy enforcer platform (e.g., using computing resource 224, processor 320, communication interface 370, and/or the like) may receive endpoint host session information identifying sessions associated with endpoint hosts communicating with the network, as described above in connection with FIGS. 1A-2.

As further shown in FIG. 6, process 600 may include generating, based on the network topology information, the network segment information, and the endpoint host session information, a data structure that includes information associating the network segments with the sessions associated with the endpoint hosts (block 640). For example, the policy enforcer platform (e.g., using computing resource 224, processor 320, memory 330, and/or the like) may generate, based on the network topology information, the network segment information, and the endpoint host session information, a data structure that includes information associating the network segments with the sessions associated with the endpoint hosts, as described above in connection with FIGS. 1A-2.

As further shown in FIG. 6, process 600 may include updating the data structure based on changes in the sessions associated with the endpoint hosts and based on changes in locations of the endpoint hosts within the network segments (block 650). For example, the policy enforcer platform (e.g., using computing resource 224, processor 320, storage component 340, and/or the like) may update the data structure based on changes in the sessions associated with the endpoint hosts and based on changes in locations of the endpoint hosts within the network segments, as described above in connection with FIGS. 1A-2.

As further shown in FIG. 6, process 600 may include identifying, based on the data structure, a particular endpoint host, of the endpoint hosts, that changed locations within the network segments (block 660). For example, the policy enforcer platform (e.g., using computing resource 224, processor 320, memory 330, and/or the like) may identify, based on the data structure, a particular endpoint host, of the endpoint hosts, that changed locations within the network segments, as described above in connection with FIGS. 1A-2.

As further shown in FIG. 6, process 600 may include determining a threat policy action to enforce for the particular endpoint host (block 670). For example, the policy enforcer platform (e.g., using computing resource 224, processor 320, storage component 340, and/or the like) may determine a threat policy action to enforce for the particular endpoint host, as described above in connection with FIGS. 1A-2.

As further shown in FIG. 6, process 600 may include causing the threat policy action to be enforced, by one or more of the network elements of the network, for the particular endpoint host (block 680). For example, the policy enforcer platform (e.g., using computing resource 224, processor 320, communication interface 370, and/or the like) may cause the threat policy action to be enforced, by one or more of the network elements of the network, for the particular endpoint host, as described above in connection with FIGS. 1A-2.

Process 600 may include additional implementations, such as any single implementation or any combination of implementations described below and/or in connection with one or more other processes described elsewhere herein.

In some implementations, the policy enforcer platform may receive host threat feed information associated with the endpoint hosts, and may add, to the data structure and based on the host threat feed information, information identifying host threat feeds associated with the endpoint hosts.

In some implementations, the policy enforcer platform may receive host threat feed information associated with the endpoint hosts, may cause, based on the host threat feed information and based on the threat policy action, host threat traffic external to the network to be blocked at a perimeter network element of the network, and may cause, based on the host threat feed information and based on the threat policy action, host threat traffic internal to the network to be blocked at a switching layer of the network.

In some implementations, the policy enforcer platform may receive host threat feed information associated with the endpoint hosts, and may tag host threats, identified by the host threat feed information, with particular identifications. In some implementations, when determining the threat policy action, the policy enforcer platform may determine the threat policy action based on a particular identification, of the particular identifications, associated with the particular endpoint host.

In some implementations, the policy enforcer platform may monitor host threat traffic across the network based on the particular identifications, and may provide information associated with the host threat traffic to a management device to prevent duplicate analysis of the host threat traffic by the management device. In some implementations, one or more of the network elements may be associated with different vendors.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a policy enforcer platform that tracks host threats in a network and enforces threat policy actions for the host threats. For example, the policy enforcer platform may receive network segment information identifying network segments associated with a network, and may receive endpoint host session information identifying sessions associated with endpoint hosts communicating with the network. The policy enforcer platform may generate, based on the network segment information and the endpoint host session information, a data structure that includes information associating the network segments with the sessions associated with the endpoint hosts. The policy enforcer platform may update the data structure based on changes in the sessions associated with the endpoint hosts and based on changes in locations of the endpoint hosts within the network segments, and may identify, based on the data structure, a particular endpoint host, of the endpoint hosts, that changed locations within the network segments. The policy enforcer platform may determine a threat policy action to enforce for the particular endpoint host, and may cause the threat policy action to be enforced, by the network, for the particular endpoint host.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors to:
   generate a data structure identifying endpoint hosts that are connected to a network and identifying a network segment of the network;
   identify, based on the data structure, an endpoint host, of the endpoint hosts, that changed location within the network segment;
   automatically determine an action to enforce for the endpoint host when the endpoint host is triggered by the changed location within the network segment; and
   cause the action to be enforced for the endpoint host.

2. The device of claim 1, wherein the data structure is generated based on network topology information; and
   the one or more processors are further to:
      process the network topology information to determine capabilities associated with the endpoint hosts; and
      store information identifying the capabilities associated with the endpoint hosts in the data structure.

3. The device of claim 1, wherein the one or more processors are further to:
   receive host threat feed information associated with the endpoint hosts; and
   add, to the data structure and based on the host threat feed information, information identifying host threat feeds associated with the endpoint hosts.

4. The device of claim 1, wherein the one or more processors are further to:
   identify a network control system that controls the network segment associated with the endpoint host; and
   wherein the one or more processors, when causing the action to be enforced, are to:
      cause the action to be enforced, by the network control system, based on the data structure.

5. The device of claim 1, wherein the one or more processors are further to:
   receive host threat feed information associated with the endpoint hosts;
   cause, based on the host threat feed information and based on the action, host threat traffic external to the network to be blocked at a perimeter network element of the network; and
   cause, based on the host threat feed information and based on the action, host threat traffic internal to the network to be blocked at a layer of the network.

6. The device of claim 1, wherein the one or more processors are further to:
   tag host threats associated with the endpoint hosts with identifications; and
   wherein the one or more processors, when determining the action, are to:
      determine the action based on an identification, of the identifications, associated with the endpoint host.

7. The device of claim 1, wherein the one or more processors, when causing the action to be enforced, are to:
   cause instructions to be executed to block internal host threat traffic.

8. A non-transitory computer-readable medium storing instructions, the instructions comprising:
   one or more instructions that, when executed by one or more processors, cause the one or more processors to:
      generate a data structure identifying endpoint hosts that are each connected to a network and identifying a network segment of the network;
      identify, based on the data structure, an endpoint host, of the endpoint hosts, that changed locations within the network segment; and
      cause an action to be enforced, by the network, for the endpoint host that is triggered by the changed location with the network segment.

9. The non-transitory computer-readable medium of claim 8, wherein the one or more processors are to:
   update the data structure based on changes in sessions associated with the endpoint hosts.

10. The non-transitory computer-readable medium of claim 8, wherein the one or more processors are to:
   update the data structure based on changes in locations of the endpoint host within the network segment.

11. The non-transitory computer-readable medium of claim 8, wherein the instructions further comprise:
   one or more instructions that, when executed by the one or more processors, cause the one or more processors to:
      provide information identifying host threat feeds associated with the endpoint hosts.

12. The non-transitory computer-readable medium of claim 8, wherein the instructions further comprise:
   one or more instructions that, when executed by the one or more processors, cause the one or more processors to:
      cause, based on the action, host threat traffic external to the network to be blocked at a perimeter network element of the network; or
      cause, based on the action, host threat traffic internal to the network to be blocked at a switching layer of the network.

13. The non-transitory computer-readable medium of claim 8, wherein the instructions further comprise:
   one or more instructions that, when executed by the one or more processors, cause the one or more processors to:
      tag host threats with identifications; and
   wherein the one or more instructions, that cause the one or more processors to determine the action, cause the one or more processors to:
      determine the action based on an identification, of the identifications, associated with the endpoint host.

14. The non-transitory computer-readable medium of claim 13, wherein the instructions further comprise one or more instructions that, when executed by the one or more processors, cause the one or more processors to:
   receive network topology information identifying capabilities of network elements of the network;
   receive network segment information identifying the network segment; and
   receive endpoint host session information identifying sessions associated with the endpoint hosts.

15. A method, comprising:
generating, by a device, a data structure identifying endpoint hosts that are each connected to a network and identifying a network segment of the network;
identifying, by the device and based on the data structure, an endpoint host, of the endpoint hosts, that changed locations within the network segment;
automatically determining, by the device, an action to enforce for the endpoint host when the endpoint host is triggered by the changed location with the network segment; and
causing, by the device, the action to be enforced by a network element of the network for the endpoint host.

16. The method of claim 15, further comprising:
receiving host threat feed information associated with the endpoint hosts; and
adding, to the data structure and based on the host threat feed information, information identifying host threat feeds associated with the endpoint hosts.

17. The method of claim 15, further comprising:
causing, based on the action, host threat traffic external to the network to be blocked at a perimeter network element of the network; or
causing, based on the action, host threat traffic internal to the network to be blocked at a layer of the network.

18. The method of claim 15, further comprising:
updating the data structure based on changes in sessions associated with the endpoint host.

19. The method of claim 18, further comprising:
monitoring host threat traffic across the network based on particular identifications; and
providing information associated with the host threat traffic to a management device to prevent duplicate analysis of the host threat traffic by the management device.

20. The method of claim 15, wherein one or more of the network elements are associated with different vendors.

* * * * *